(12) United States Patent
Kim

(10) Patent No.: US 10,951,979 B2
(45) Date of Patent: Mar. 16, 2021

(54) ROBOT

(71) Applicant: LG ELECTRONICS INC., Seoul (KR)

(72) Inventor: Moonchan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 16/431,106

(22) Filed: Jun. 4, 2019

(65) Prior Publication Data

US 2019/0394563 A1    Dec. 26, 2019

(30) Foreign Application Priority Data

Jun. 25, 2018    (KR) .................. 10-2018-0072887

(51) Int. Cl.
| | |
|---|---|
| *H04R 1/02* | (2006.01) |
| *H04R 9/06* | (2006.01) |
| *H04R 1/28* | (2006.01) |
| *H04R 1/34* | (2006.01) |
| *G06T 7/70* | (2017.01) |
| *H04W 4/70* | (2018.01) |
| *H04L 12/28* | (2006.01) |
| *G10L 15/22* | (2006.01) |
| *H04R 1/40* | (2006.01) |

(52) U.S. Cl.
CPC ............ *H04R 1/345* (2013.01); *G06T 7/70* (2017.01); *H04L 12/2818* (2013.01); *H04L 12/2825* (2013.01); *H04L 12/2834* (2013.01); *H04R 1/02* (2013.01); *H04W 4/70* (2018.02); *G06T 2207/10004* (2013.01); *G06T 2207/30201* (2013.01); *G10L 15/22* (2013.01); *G10L 2015/223* (2013.01); *H04R 1/406* (2013.01)

(58) Field of Classification Search
CPC ... H04R 1/02; H04R 9/06; H04R 1/28; H04R 1/025; H04R 1/026
USPC .................... 381/332–336, 345, 387–389
See application file for complete search history.

(56) References Cited

U.S. PATENT DOCUMENTS

| | | |
|---|---|---|
| 2002/0198626 A1 | 12/2002 | Imai et al. |
| 2008/0095395 A1* | 4/2008 | Pieklik ............. A61H 33/60 381/387 |
| 2011/0172822 A1 | 7/2011 | Ziegler et al. |
| 2012/0197439 A1 | 8/2012 | Wang et al. |
| 2015/0131842 A1 | 5/2015 | Watanabe et al. |
| 2015/0201255 A1* | 7/2015 | Porter ................ H04R 1/02 381/334 |
| 2017/0242478 A1 | 8/2017 | Ma |

(Continued)

FOREIGN PATENT DOCUMENTS

| | | |
|---|---|---|
| CN | 105904463 | 9/2017 |
| CN | 105364933 | 10/2017 |
| JP | 6092859 | 3/2017 |

(Continued)

OTHER PUBLICATIONS

International Search Report dated Oct. 1, 2019.
European Search Report dated Oct. 9, 2019.

*Primary Examiner* — Suhan Ni
(74) *Attorney, Agent, or Firm* — KED & Associates LLP

(57) ABSTRACT

A robot includes an enclosure of a speaker that is formed as an arc or annular shape along a circumferential direction of a body. In addition, a display and the speaker are positioned to one side of a rotation axis of the body.

18 Claims, 17 Drawing Sheets

(56) References Cited

U.S. PATENT DOCUMENTS

2018/0007463 A1   1/2018   Kim et al.

FOREIGN PATENT DOCUMENTS

| KR | 10-2014-0040094 | 4/2014 |
| KR | 10-2017-0097581 | 8/2017 |
| KR | 10-2018-0004493 | 1/2018 |
| KR | 10-1815062 | 1/2018 |
| WO | WO 2012/091801 | 7/2012 |
| WO | WO 2017/206613 | 12/2017 |

* cited by examiner

ROBOT

CROSS-REFERENCE TO RELATED APPLICATION

The present application claims priority under 35 U.S.C. 119 and 35 U.S.C. 365 to Korean Patent Application No. 10-2018-0072887, filed Jun. 25, 2018, which is hereby incorporated by reference in its entirety.

BACKGROUND

1. Field

A robot including a speaker is disclosed herein.

2. Background

Robots may communicate with humans by voice or gesture and can provide the user with visual information or auditory information. Robots may move in three dimensions while being panned or tilted, and an example of such a robot is disclosed in Korean Patent Laid-Open Publication No. 10-2014-0040094 A (Apr. 2, 2014).

The related art robot includes a head for supporting an interfacing module, a neck, a body, and the like, further includes a rotator for rotating the head with respect to the body and a tilter for tilting the head with respect to the body at a predetermined angle independently of the rotator, and the tilter includes a tilter motor that moves the head between angles of ±90° to the Z-axis.

BRIEF DESCRIPTION OF THE DRAWINGS

Embodiments will be described in detail with reference to the following drawings in which like reference numerals refer to like elements and, wherein.

DETAILED DESCRIPTION

Figure 1:
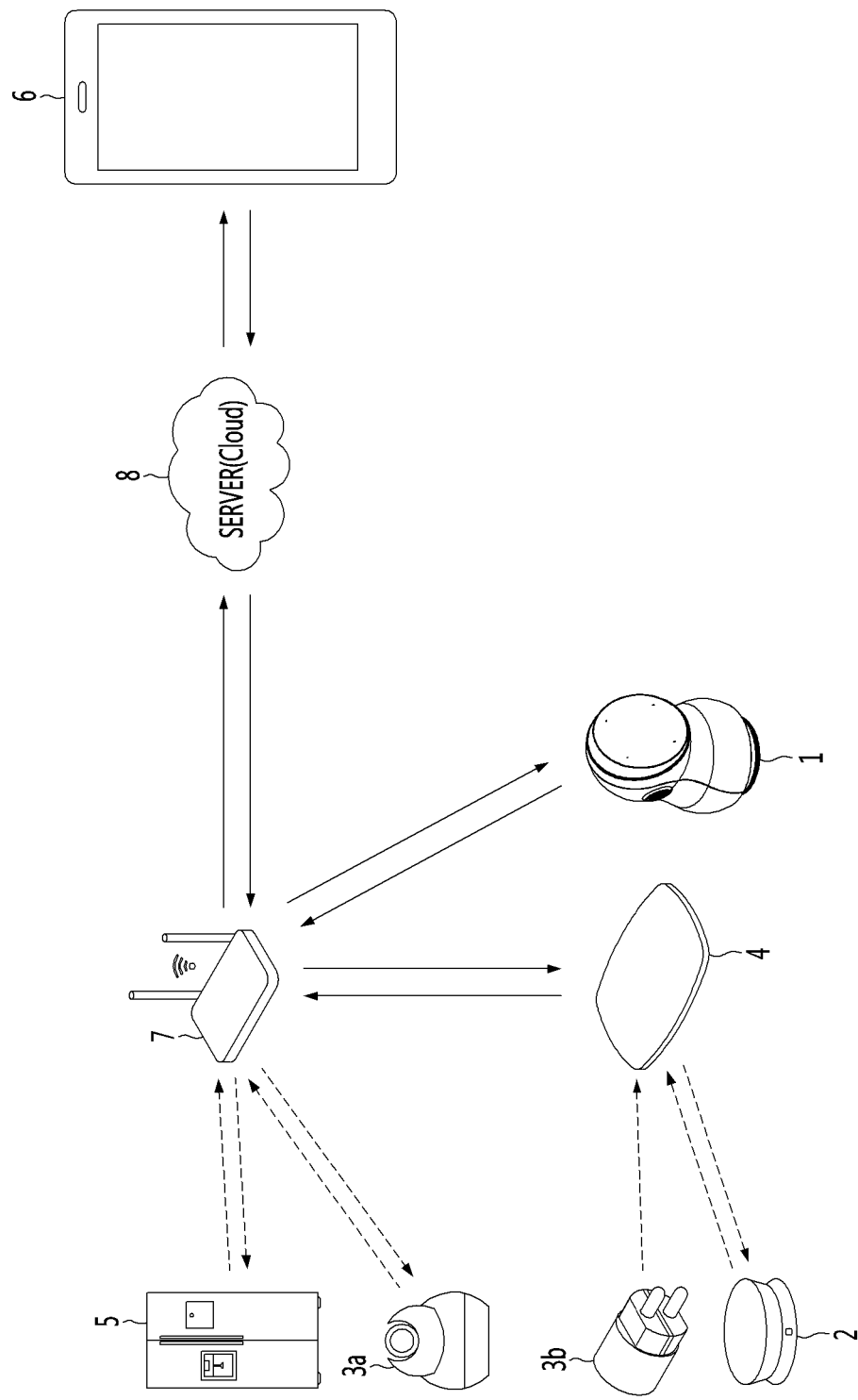
FIG. 1 is a diagram illustrating an example of a network system to which a robot according to an embodiment of the present disclosure is applied.
Figure 2:
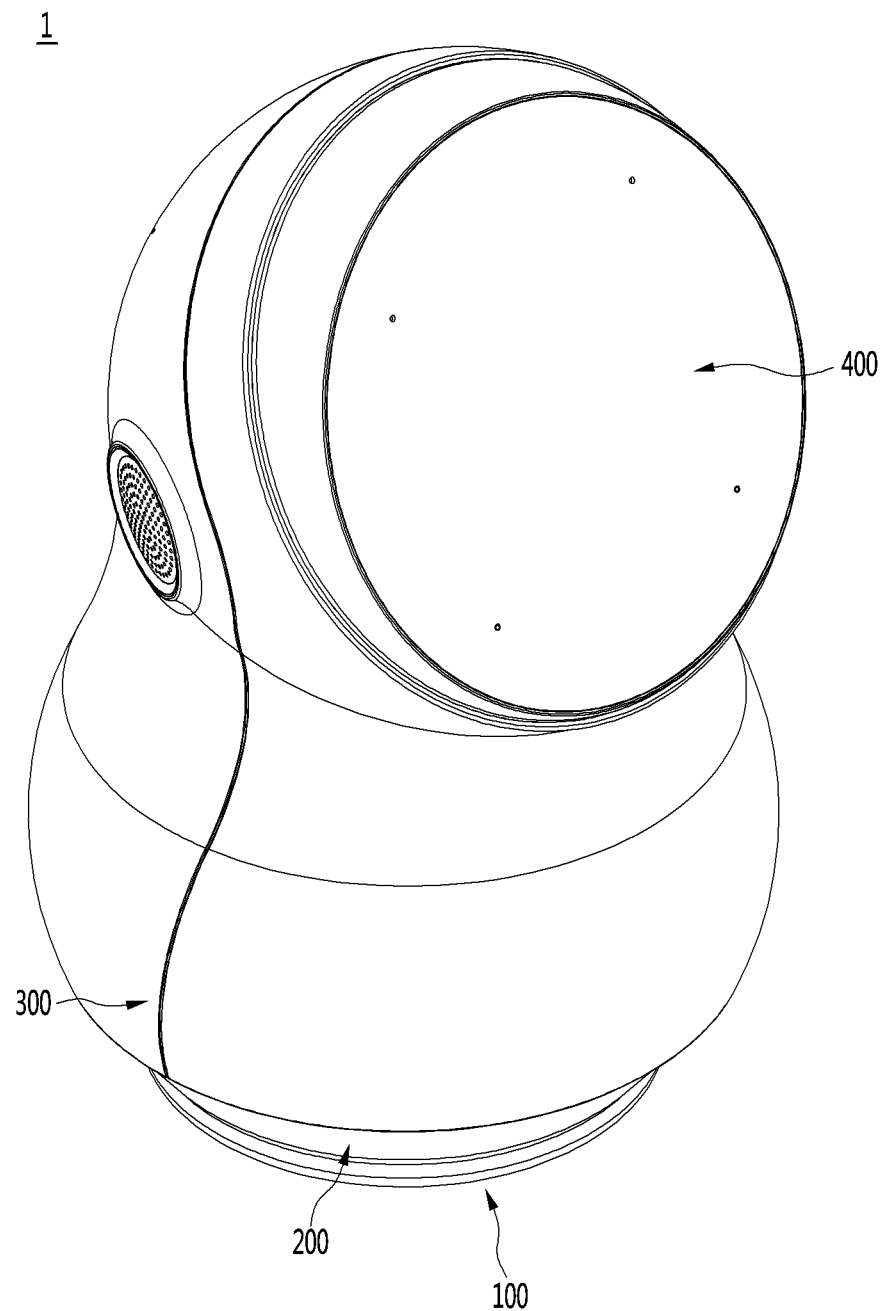
FIG. 2 is a perspective view illustrating the robot according to an embodiment.
Figure 3:
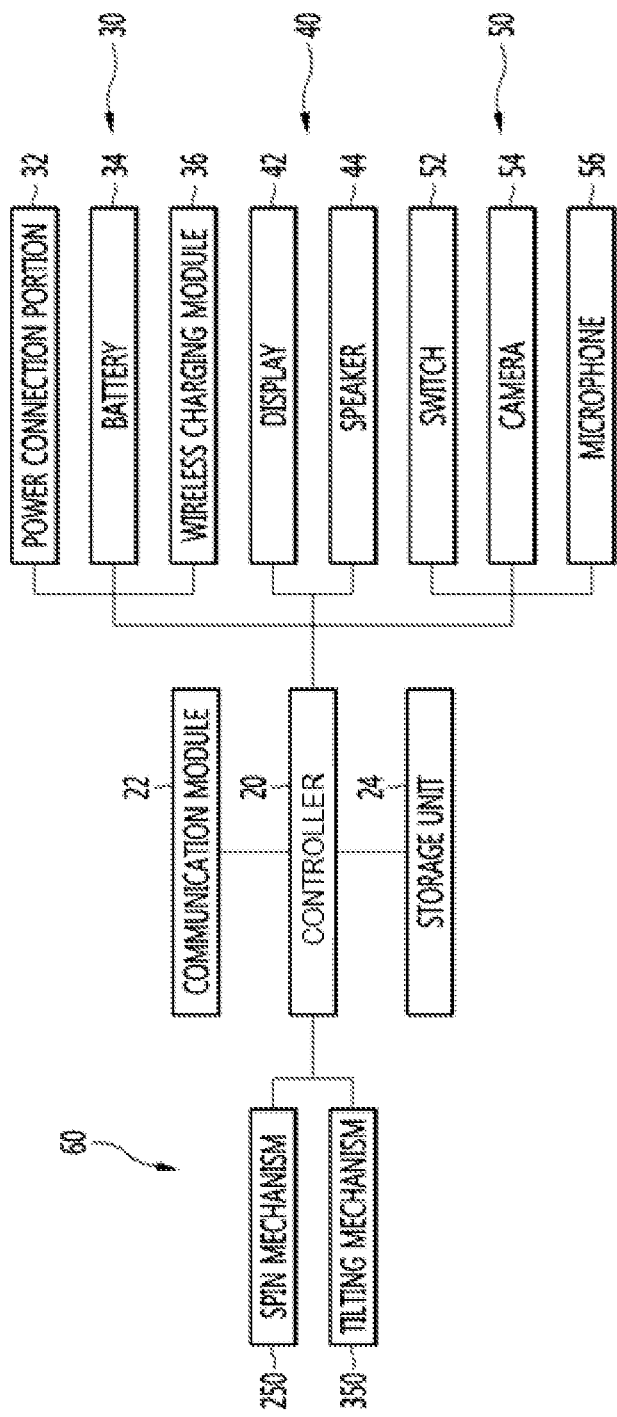
FIG. 3 is a control block diagram of the robot according to an embodiment.
Figure 4:
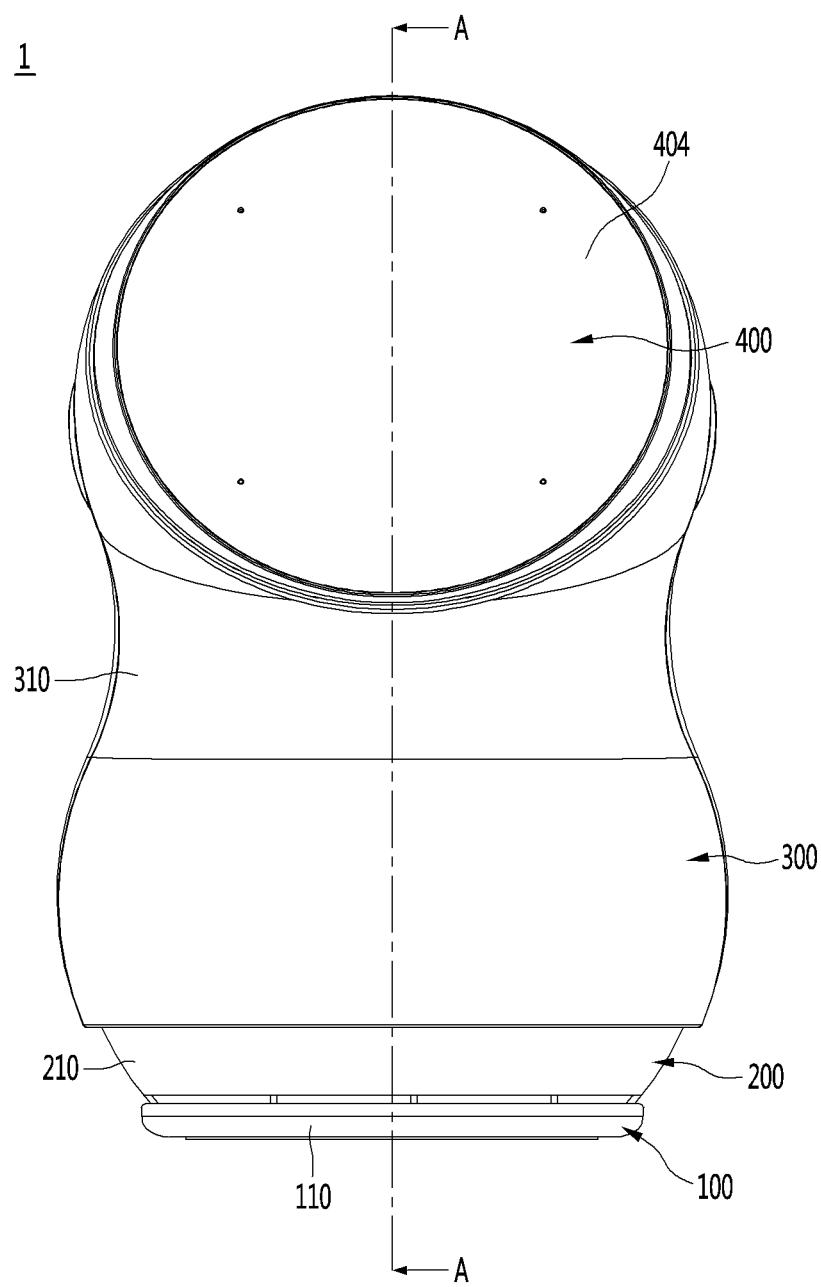
FIG. 4 is a front view illustrating the robot according to an embodiment.
Figure 5:
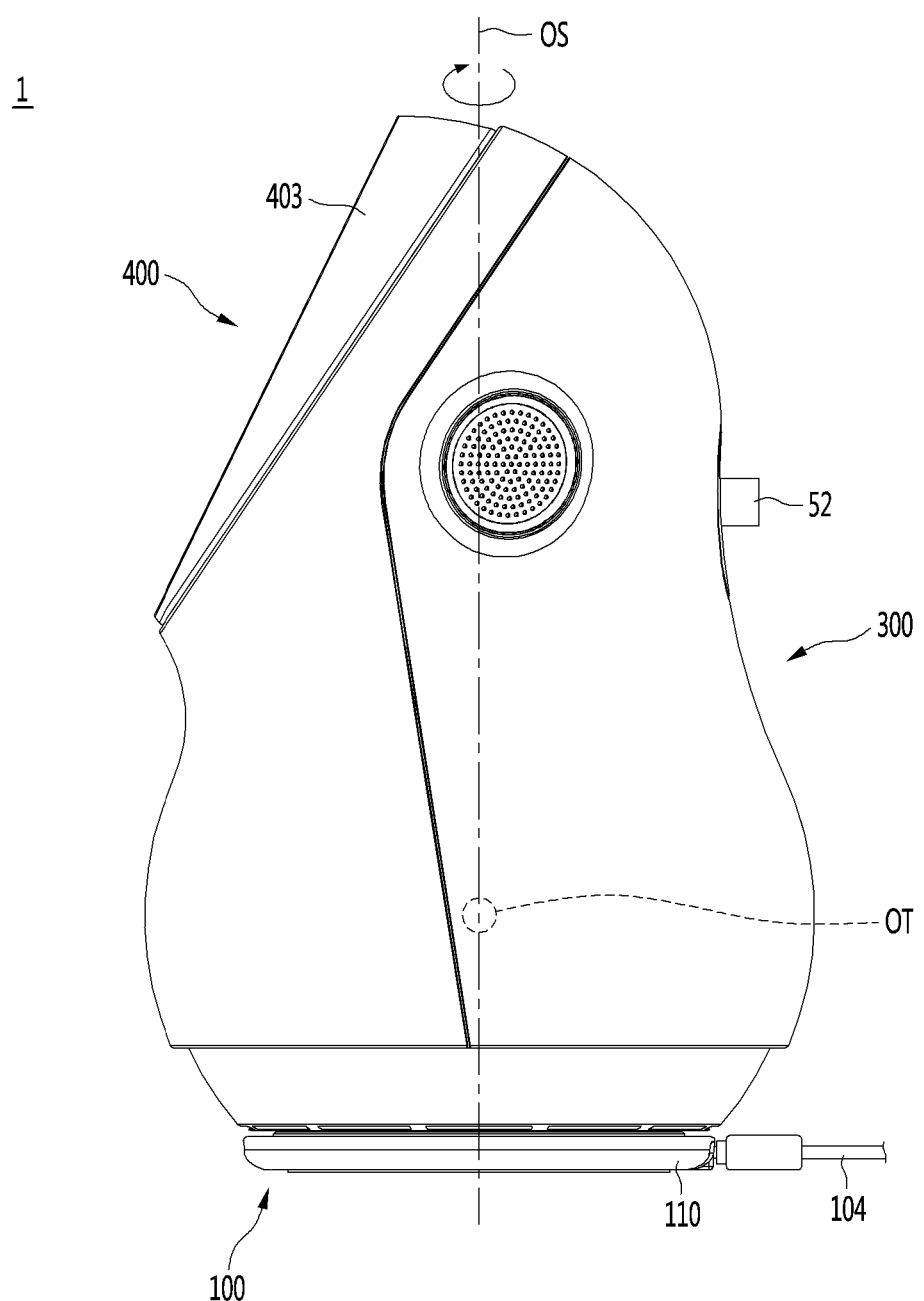
FIG. 5 is a front view illustrating when a rotation body of the robot according to an embodiment is rotated in one direction.
Figure 6:
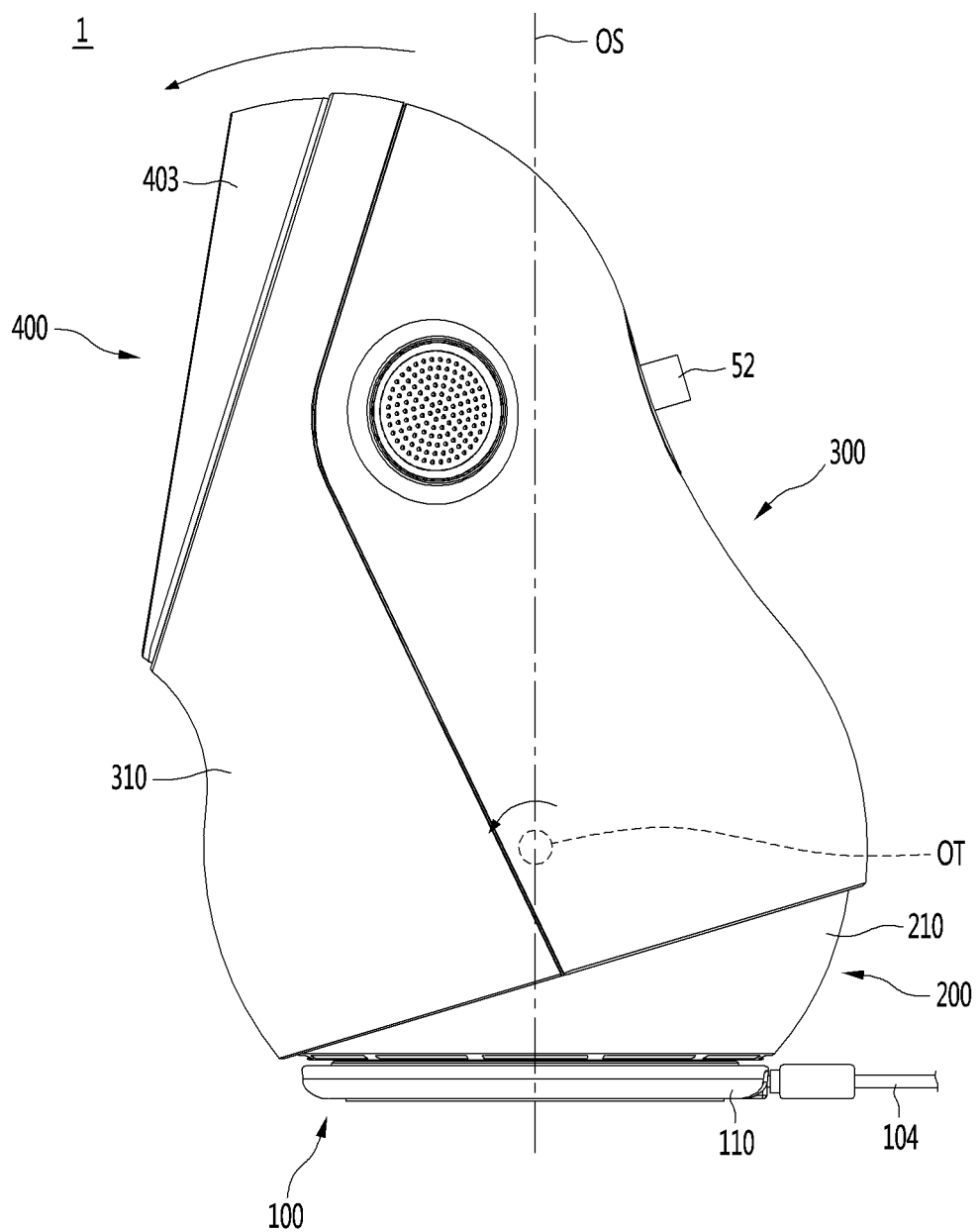
FIG. 6 is a side view illustrating when the tilting body of the robot according to an embodiment is tilted forward.
Figure 7:
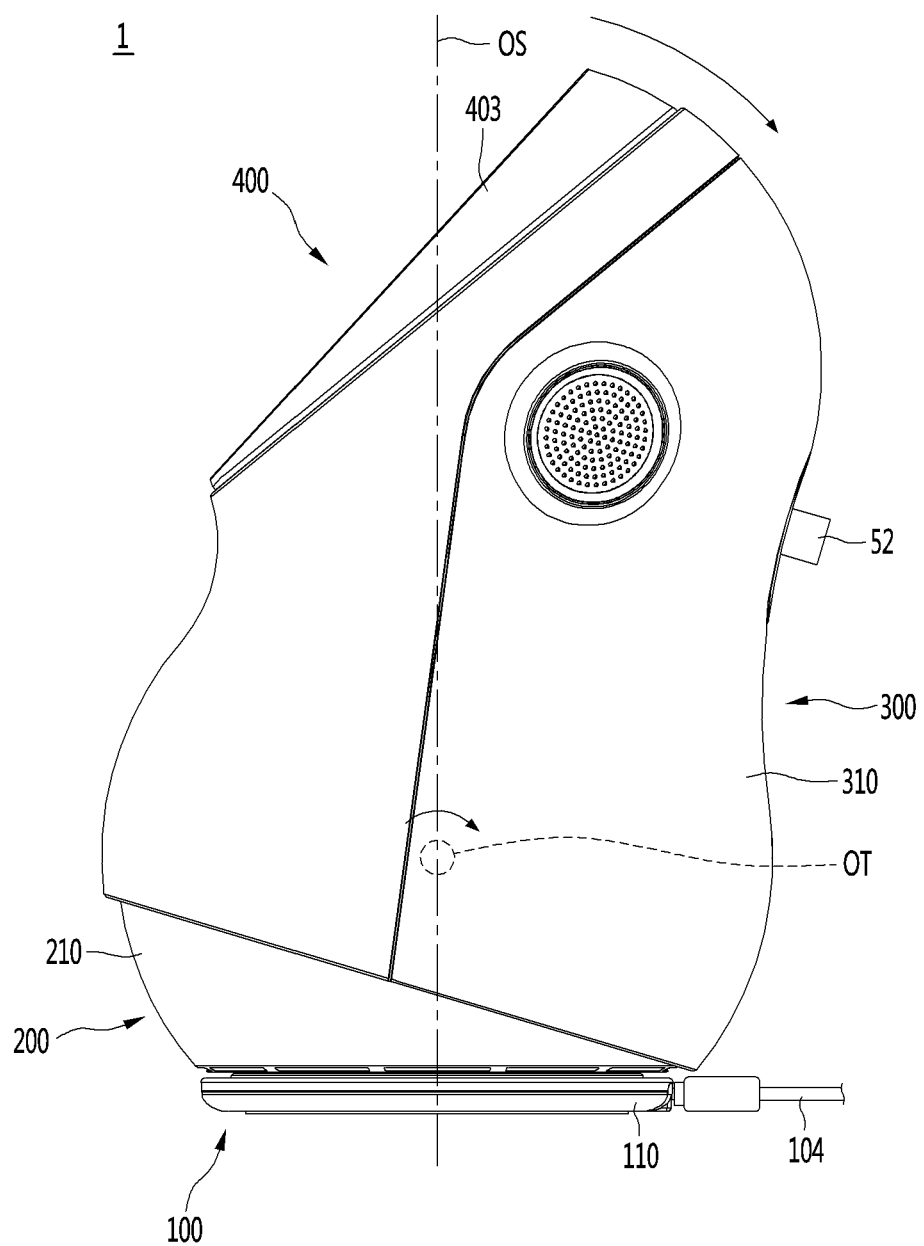
FIG. 7 is a side view illustrating when the tilting body of the robot according to an embodiment is tilted rearward.

Hereinafter, specific embodiments of the present disclosure will be described in detail with reference to the drawings. As illustrated in FIG. 1, a network system may include a hub robot 1, an accessory 2, 3a, and 3b, a gateway 4, a terminal 6, an access point 7, and a server 8, each of which transmit information to each other through a wired network or a wireless network. Networks may be built based on technologies such as wi-fi, Ethernet, ZigBee, Z-wave, Bluetooth, or the like.

The robot 1, the accessories 2, 3a, and 3b, the gateway 4, and the access point 7 may include a communication module connectable to the network according to a predetermined communication protocol. According to the configuration of the network, a communication module provided in the respective devices 1, 2, 3a, 3b, 4, and 7 constituting the network system may be determined, and according to the communication method between each device and the network or between devices, a plurality of communication modules may be provided in the devices The robot 1 may be connected to the access point 7 via a wired (e.g., Ethernet) or wireless (e.g., wi-fi) communication. The communication between the robot 1 and the accessories 2 and 3b may be performed via the gateway 4 and the access point 7 and as another example, via the access point 7, the communication between the robot 1 and the accessories 3a or other devices 5 may be performed with each other.

A signal transmitted from the accessory 2 and 3b may be transmitted to the robot 1 via the gateway 4 and the access point 7 in order, and the signal transmitted from the robot 1 may be transmitted to the accessory 2 and 3b via the access point 7 and the gateway 4 in order. As another example, a signal transmitted from the accessory 3a or other devices 5 may be transmitted to the robot 1 via the access point 7, and the signal transmitted from the robot 1 may be transmitted via the access point 7 to the accessory 3a or other devices 5.

For example, information acquired by a sensor module of the accessory 2, 3a, and 3b may be transmitted to the server 8, the terminal 6, or the robot 1 via the network. A signal for controlling the sensor module, the control module, or the remote control module from the server 8, the robot 1 or the terminal 6 may be transmitted to the accessory 2. The transmission of such a signal may be made via the gateway 4 and/or the access point 7.

Communication between the accessory 2, 3a, and 3b and the robot 1 may be possible only with the gateway 4 and the access point 7. For example, even in a case where the home network is disconnected from the external communication network such as the Internet, communication between the accessory 2, 3a, and 3b and the robot 1 may be possible.

Information transmitted from the robot 1 or the accessory 2 may be stored in the server 8 when the robot 1 is connected to the server 8 via the access point 7. The information stored in the server 8 may be received by the terminal 6 connected to the server 8.

In addition, the information transmitted from the terminal 6 may be transmitted to the robot 1 or the accessory 2 via the server 8. A smartphone which is a widely used terminal in recent days may provide a convenient UI based on a graphic and therefore it may be possible to control the robot 1 and/or the accessory 2 through the UI or to process and display the information received from the robot 1 and/or the accessory 2. In addition, by updating an application installed on the smartphone, functions that can be implemented through the robot 1 and/or the accessory 2 may be extended.

The terminal 6 and the robot 1 may directly communicate with each other regardless of the server 8. For example, the robot 1 and the terminal 6 may directly communicate with each other using a Blue-Tooth method. It may also be possible to control the accessory 2 or process and display information received from the accessory 2 only by the robot 1 without using the terminal 6.

The network system may be configured without the gateway 4 and the robot 1 may also perform the functions to be performed by the gateway 4. The accessory 2, 3a, and 3b may include at least one communication module to connect with the network. The communication module may communicate with a predetermined network.

The accessory 2, 3a, and 3b may comprise a sensor module configured to sense a predetermined surrounding environment. The accessory 2, 3a, and 3b may include a control module that performs a specific function that affects the surrounding environment. The accessory 2, 3a, and 3b may include a remote control module that transmits an optical signal (e.g., an infrared signal) that controls a given peripheral device.

The accessory 2, 3a, and 3b with the sensor module may include a device with, for example, an air pressure sensor, a humidity sensor, a temperature sensor, a radiation detection sensor, a heat detection sensor, a gas detection sensor, an air quality sensor, an electronic nose sensor, a healthcare sensor, a biometric sensor, a sleep sensor (for example, attached to a user's pajamas or underwear and detecting snoring, apnea, and tossing while the user is sleeping), a proximity sensor, an illuminance sensor, an acceleration sensor, a magnetic sensor, a gravity sensor, a gyroscope sensor, a motion sensor, an RGB sensor, an infrared sensor (IR sensor), an ultrasonic sensor, a remote detection sensor, a SAR, a radar, an optical sensor (for example, an image sensor, an image sensor), or the like, as a number of examples.

The accessory 2, 3a, and 3b with the control module may include, for example, a smart lighting capability to control the lighting, a smart plug to regulate the application and degree of the power supply, a smart temperature regulator to regulate the operation and intensity of the boiler or the air conditioner, and a smart gas lock that controls whether or not the gas is shut off, for example. The accessories 2, 3a, 3b provided with the remote control module may include, for example, a device with an infrared LED or the like that emits an infrared (IR) signal to a remotely controllable household appliance or the like, for example.

The accessories (for example, 3a and 3b) may be installed only for the purpose set to perform a predetermined performance. For example, the accessory 3a may a video camera and the accessory 3b may be a smart plug.

The accessory 2 according to an embodiment may be provided so that the accessory 2 can be installed at any position desired by the user. In addition, it can be provided so as to be utilized for various purposes. For example, the accessory 2 may be attached to an external object such as a household appliance, a door, a window, or a wall body.

The gateway 4 may mediate communication between the at least one accessory 2 and 3b and the access point 7. The gateway 4 may communicate with the accessory 2 wirelessly. The gateway 4 may communicate with the access point 7 by wire or wirelessly. For example, the communication between the gateway 4 and the access point 7 may be based on Ethernet or wi-fi.

The access point 7 may be connected to the server 8 via wired or wireless communication. The server 8 may be connectable via the Internet and may communicate with the server 8 through various terminals 6 connected to the Internet. The terminal 6 may be a mobile terminal such as a personal computer (PC) or a smartphone, for example.

The accessory 2 and 3b may be configured to communicate with the gateway 4. As another example, the accessory 3a may communicate directly with the access point 7 without via the gateway 4.

The access point 7 may directly communicate with the accessory 3a or other devices 5 equipped with the communication module without via the gateway 4. These devices 5 and 3a may be provided with a Wi-Fi communication module so that they can directly communicate with the access point 7 without the gateway 4.

As shown in FIGS. 2-7, a robot 1 according to an embodiment may include a base 100; a spin body 200 rotatably disposed on the base 100 and forming a lower part of the exterior of the robot 1; a tilting body 300 supported on the spin body 200 so as to be capable of being tilted by a tilting shaft OT; and at least one interface 42, 44, 54, and 56 installed in at least one of the spin body 200 and the tilting body 300. The base 100 may be positioned at a lowermost end portion of the robot 1. The base 100 may be not movable and placed on a floor surface to support the robot 1.

The spin body 200 may be rotatable with respect to the base 100. The spin body 200 may be rotated with respect to the base 100 about the rotation axis OS extending in an up and down or vertical direction. The rotation axis OS may be a virtual rotation axis.

The spin body 200 may be rotatable with respect to the base 100. The spin body 200 may be rotated with respect to the base 100 about the rotation axis OS extending in an up and down or vertical direction. The rotation axis OS may be a virtual axis.

The spin body 200 may be rotated by a predetermined angle, for example by 360 degrees. The spin body 200 may be rotated clockwise or counterclockwise about the rotation axis OS.

The tilting body 300 may be supported on the spin body 200 to be tiltable about a tilting axis OT, which may be horizontal and perpendicular to rotation axis OS. The tilting shaft OT may be elongated in the horizontal direction. The tilting shaft OT may be rotated together with the spin body 200 when the spin body 200 is rotated.

The tilting body 300 may be rotated together with the spin body 200 when the spin body 200 is rotated and may be connected to the spin body 200 to be tiltable. Since the tilting body 300 may be rotated and tilted, the tilting body 300 may have degrees of freedom (DOF) of 2.

The robot 1 may include a control unit or controller 20 configured to control the robot 1. In addition, the controller 20 may be provided in the server 8 or the terminal 6 to control the robot 1 through a network.

The robot 1 may include a communication module 22 configured to communicate with a network. The communication module 22 may include a Wi-Fi module, a Bluetooth module, a ZigBee module, a G-wave module, and the like.

The communication module 22 may be changed according to a communication method of a device to be directly communicated. The communication module 22 may communicate with at least one of the access point 7, the gateway 4, the accessories 2, 3a, and 3b, the server 8, and the terminal 6 constituting the network system.

The information acquired from an input unit (or input) 50 through the communication module 22 may be transmitted over the network. Information may be received by the robot 1 on the network via the communication module 22 and the controller 20 may control an output unit (or output) 40 or a drive unit (or drive) 60 based on the received information.

The robot 1 may include a storage unit (or memory) 24 for storing information. The memory 24 may store information received from the network through the communication module 22. The memory 24 may store a command from the input 50. The memory 24 may store information relating to the overall operation of the robot 1 in advance.

The robot 1 may include a power supply device 30 for supplying power to the respective configurations of the robot 1. The power supply device 30 may include a power connection portion 32 which may connect an external wired power cable. The power connection portion 32 may be implemented as a socket. The power supply device 30 may include a battery 34. The battery 34 may be implemented as a rechargeable battery capable of being recharged. The power supply device 30 may further include a wireless charging module 36 which may charge the battery 34.

The robot 1 may include the output 40. The output 40 may visually or audibly output information to the outside. The output 40 may include a display 42 for visually outputting information. The output 40 may include a speaker 44 for outputting information audibly.

The robot 1 may include the input 50. The input 50 may receive a command for controlling the robot 1. The input 50 may be configured so that a user can directly input commands and the like without the communication module 22. The input 50 may receive a command for controlling the accessory 2.

The input 50 may include a switch 52. The switch 52 may include a power switch for turning the power supply of the robot 1 on and off. The switch 52 may include a function switch for setting the function of the robot 1, pairing with a predetermined network, or pairing with the terminal 6. It may be possible to set various commands to be given to the robot 1 through a combination of the pushing time and/or the number of continuous pushes of the function switch in advance. The switch 52 may include a reset switch that may reset a predetermined setting of the robot 1. The switch 52 may include a sleep switch for switching the robot 1 to a power-saving state or a non-output state.

The input 50 may include a camera 54 for sensing an external visual image. The camera 54 may acquire an image for recognizing the user. The camera 54 may acquire an image for recognizing the direction of the user. The image information acquired by the camera 54 may be stored in the storage unit 24. The input 50 may further include a touch-type display.

The input 50 may include a microphone 56 for sensing an external sound. When the robot 1 is equipped with the microphone 56, the controller 20 of the robot 1 may recognize a voice of the user inputted through the microphone 56 and extract the command. In order to recognize the position of the sound source, the input 50 may include a plurality of microphones 56. The sound information acquired by the microphone 56 or the location information of the user may be stored in the memory 24.

The robot 1 may include a direction sensor for detecting the direction of the user with respect to the robot 1. The direction sensor may comprise a camera 54 and/or a plurality of microphones 56.

The robot 1 may include the drive 60 for performing motions of the robot 1. The robot 1 may perform the motion of the robot 1 together with the output contents of the display 42 or the output contents of the speaker 44 of the robot 1 to imitate a living creature. The motion of the robot 1 by the drive 60 may perform a function of causing the user to effectively recognize the output contents of the output 40 just as gestures (motions) or eye contacts play a big role in communication between humans. The motion of the robot 1 by the drive 60 is for adding emotional elements in the communication process between the user and the robot 1.

The drive 60 may include a plurality of drive units or drives 250 and 350. The plurality of drives 250 and 350 may be independently driven or simultaneously driven to enable complex motion.

The drive 60 may include a spin mechanism 250 for rotating the spin body 200 with respect to the base 100. The spin mechanism 250 may provide power to rotate the spin body 200 about the rotation axis Os extending in the up and down or vertical direction with respect to the base 100. The rotation axis Os may mean a virtual rotation axis.

The drive 60 may further include a tilting mechanism 350 that tilts the tilting body 300 about the tilting shaft OT. The tilting mechanism 350 may provide power such that the tilting body 300 may be tilted to one side with respect to the spin body 200.

The tilting mechanism 350 may provide power to rotate the tilting body 300 about the tilting shaft or axis OT. The tilting mechanism 350 may be connected to the spin body 200 and the tilting mechanism 350 and the tilting body 300 may be rotated together with the spin body 200 when the spin body 200 is rotated by the spin mechanism 250.

The controller 20 may control the communication module 22 based on the control information received from the input 50. The controller 20 may control the communication module 22 to store the information received from the network in the memory 24. The controller 20 may transmit the information stored in the memory 24 via the communication module 22 to the network.

The controller 20 may receive control information from the input 50. The controller 20 may control the output 40 to output predetermined information. The controller 20 may control the drive 60 to operate together with the information output of the output 40.

For example, the controller 20 may recognize who is a user based on the image acquired by the camera 54, and may operate the output 40 and the drive 60 based on the recognition result. If the recognized user matches the preset user, the controller 20 may display a smiling image on the display 42 and activate the tilting mechanism 350 to tilt the tilting body 300 in the up and down direction or the left and right direction. As another example, the controller 20 may recognize the face position of the user based on the direction sensor and operate the output 40 and the drive 60 based on the recognition result.

The controller 20 may display predetermined information on the display 42 and may operate the spin mechanism 250 to operate the display 42 to face the user's face. The controller 20 may control the spin body 200 to be rotated so as to switch the image output direction of the display 42 to the direction of the user detected by the direction sensor.

The controller 20 may control whether or not the drive 60 is operated based on the control information received from the network through the communication module 22. The controller 20 may control the drive 60 based on the control information received from the input 50. The controller 20 may control the drive 60 based on the control information stored in the memory 24.

The robot 1 may include a remote control module. The remote control module may transmit an optical signal (for example, an infrared signal) for controlling a predetermined peripheral device. The predetermined peripheral device may mean a peripheral device which can perform remote control. For example, the predetermined peripheral device may be a washing machine, a refrigerator, an air conditioner, a robot cleaner, a TV, or the like, which may be controlled by a remote controller.

The remote control module may include a light emitting unit for emitting a predetermined optical signal for controlling a predetermined peripheral device. For example, the light emitting portion may be an LED that emits infrared rays. The direction in which the remote control module irradiates the optical signal may be changed according to the operation of the robot 1. The optical signal irradiating direction of the remote control module may be changed in a direction of the specific device requiring the remote control, thereby controlling the specific device with the optical signal.

The display 42, the speaker 44, the camera 54, the microphone 56, and the like, which may constitute the robot 1 may be interfaces for assisting communication between the human and the robot 1, these interfaces may be rotated together with the spin body 200 when the spin body 200 is rotated and can be tilted together with the tilting body 300 by being mounted on the tilting body 300. The robot 1 may be orientated such that the interfaces such as the display 42, the speaker 44, the camera 54, and the microphone 56 are dispersed throughout the spin body 200 and the tilting body 300.

The robot 1 may include interface modules 400 and 410 including at least one of interfaces such as a display 42, a speaker 44, a camera 54, and a microphone 56. The interface modules 400 and 410 may be mounted on the tilting body 300, may be rotated together with the tilting body 300 when the spin body 200 is rotated, and may be tilted together with the tilting body 300 when the tilting body 300 is tilted.

The battery 34, the display 42, the speaker 44, the camera 54, the microphone 56, the spin mechanism 250, the tilting mechanism 350, and the like may be supported to the spin body 200 or the tilting body 300 considering each of the weights and sizes thereof and the robot may be arranged so that the entire center of gravity of the robot can be minimized.

Figure 8:
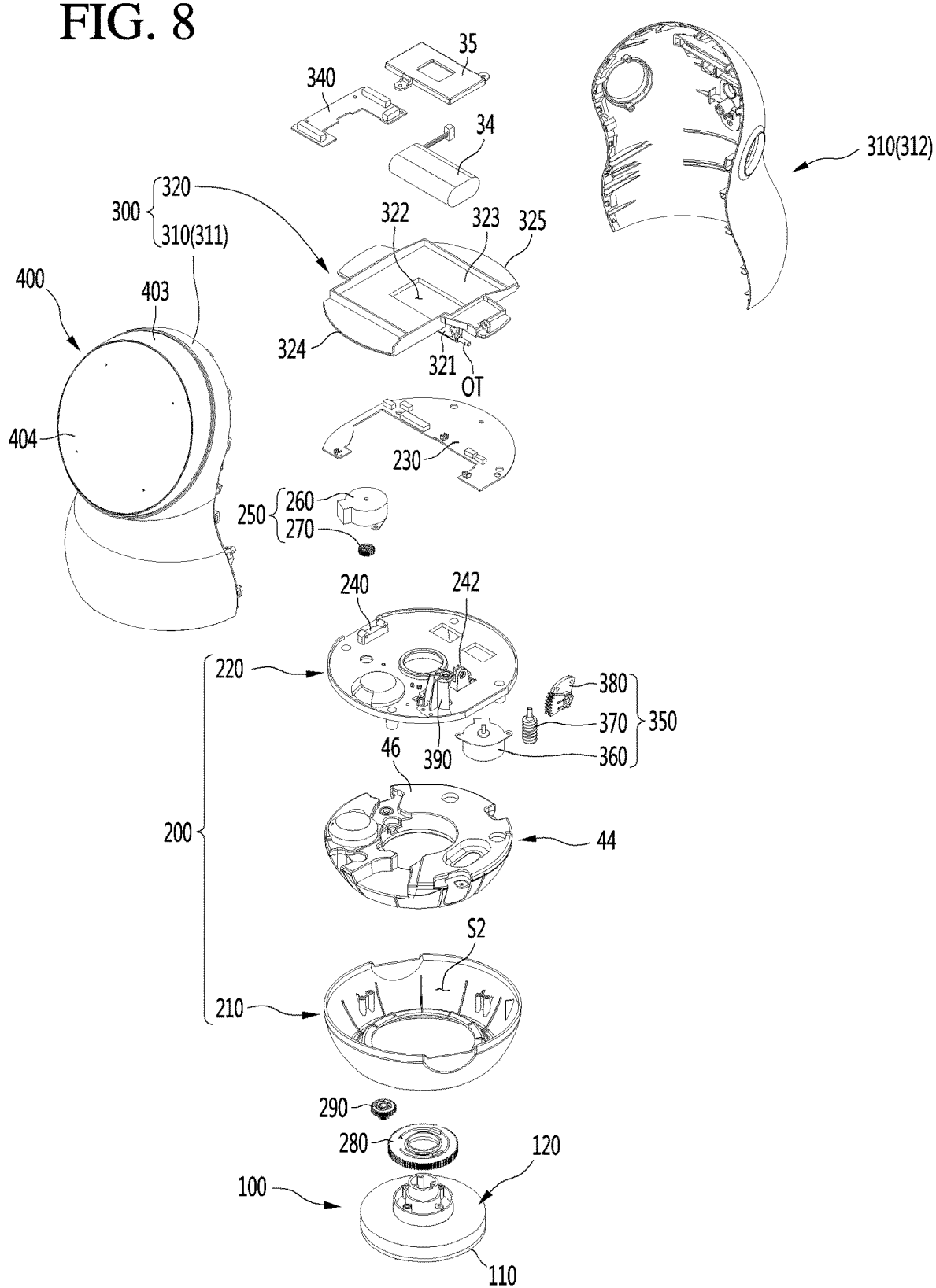
FIG. 8 is an exploded perspective view illustrating the robot according to an embodiment.
Figure 9:
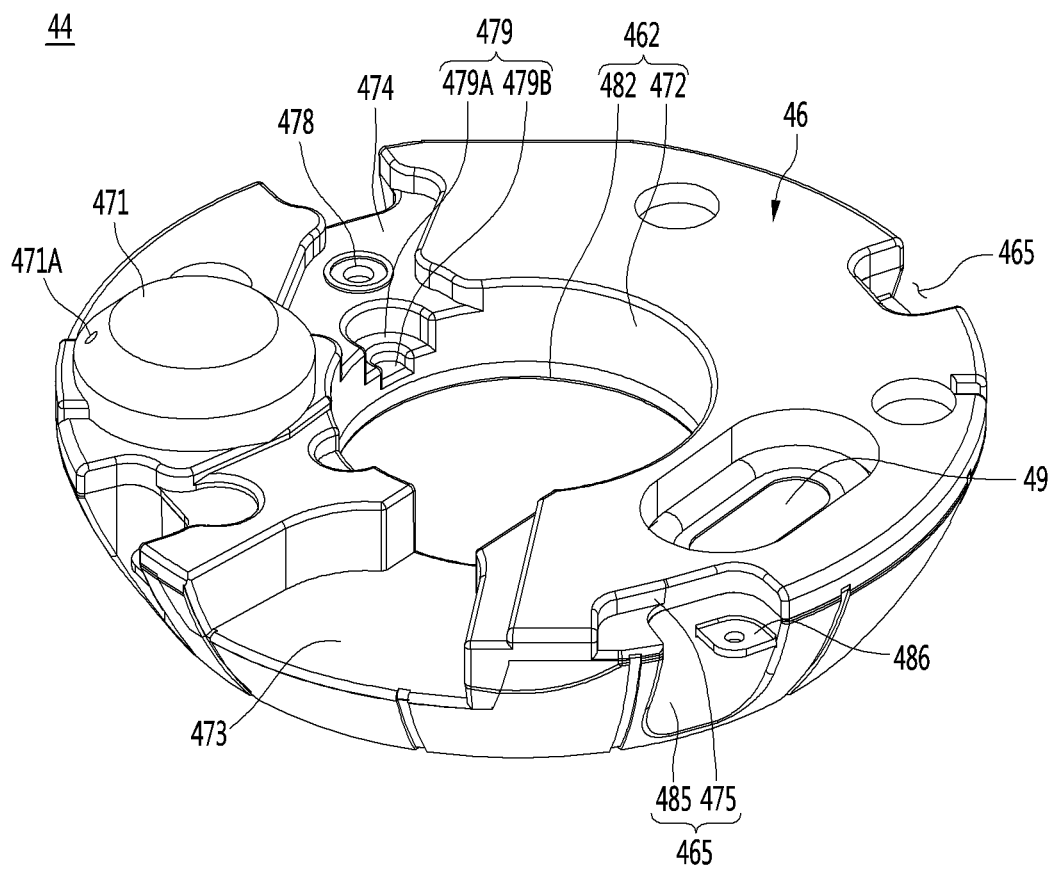
FIG. 9 is a perspective view illustrating a speaker according to an embodiment.

According to FIG. 8, the base 100 may support the spin body 100 in a rotatable manner and may support loads of the spin body 200, the tilting body 300, and the interface modules 400 and 410. The base 100 may be composed of a combination of a plurality of members. More specifically, the base 100 may include a base body 110 supporting the entire load of the robot 1, and a spin body connection portion or connector 120 which is fastened to the upper side of the base body 110 and to which the spin body 200 is rotatably connected.

The shape of the base body 110 is not limited and may have a disk shape, for example. In order to stably support the robot 1, the size of the base body 110 may be equal to or greater than the size of the spin body connection portion 120. A more detailed configuration of the base 100 will be described later in detail.

The spin body 200 may include a spin housing 210 having a space S2 formed therein and a spin cover 220 covering the space S2 from above. At least one of the spin housing 210 and the spin cover 220 may be rotatably connected to the base 100. The spin housing 210 may form a lower part of the exterior of the robot 1.

A predetermined interface may be accommodated in the space S2 inside the spin body 200. For example, the speaker 44 may be accommodated in the space S2 inside the spin body 200. The speaker 44 may be accommodated in the space S2 inside the spin body 200 because it is heavy in weight compared to other components. However, the present disclosure is not limited to this, and it is also possible to accommodate other interfaces such as the microphone 56, the battery 34, the drive PCB 230, or the like in the space S2 inside the spin body 200.

Figure 10:
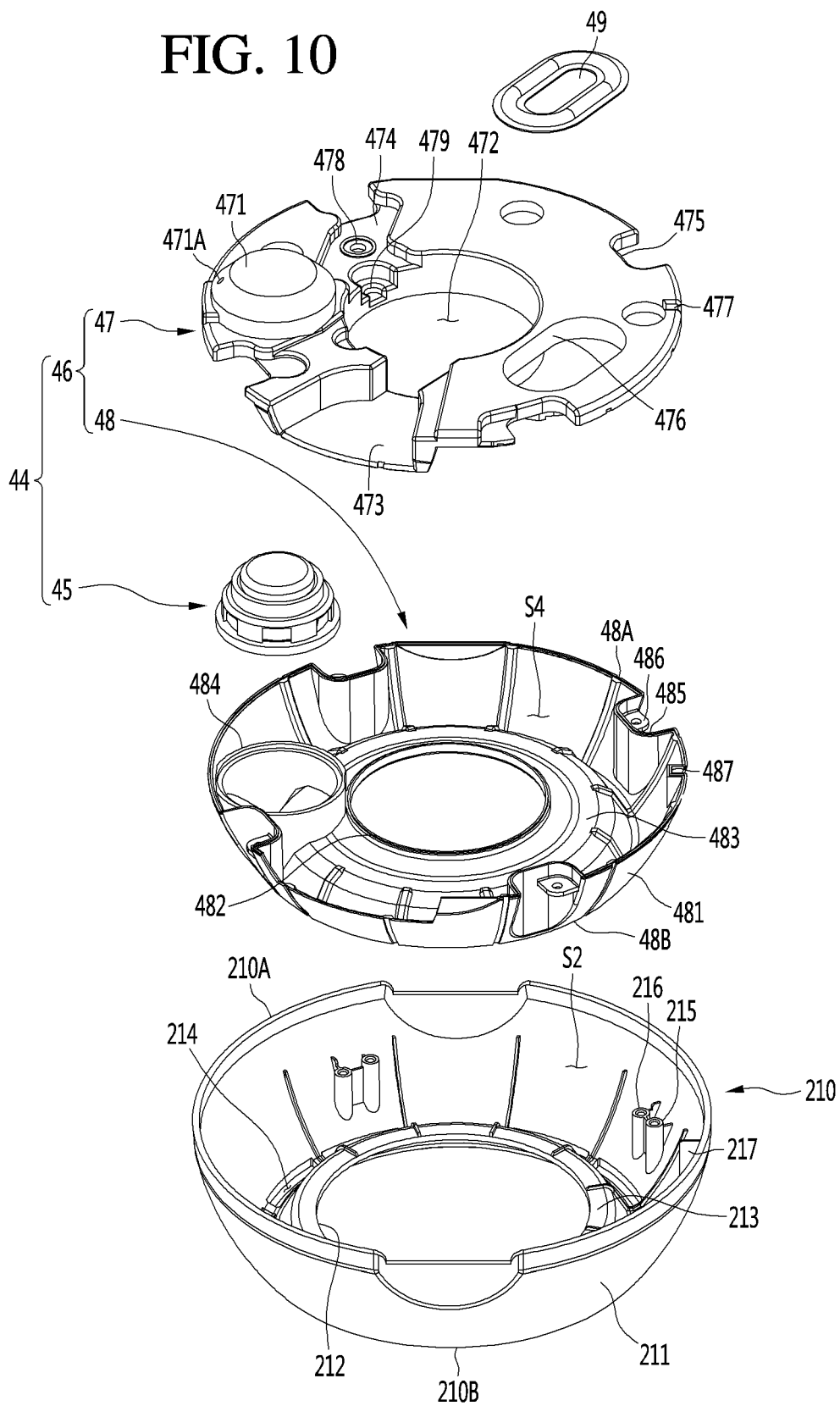
FIG. 10 is an exploded perspective view of a spin housing and the speaker according to an embodiment.
Figure 11:
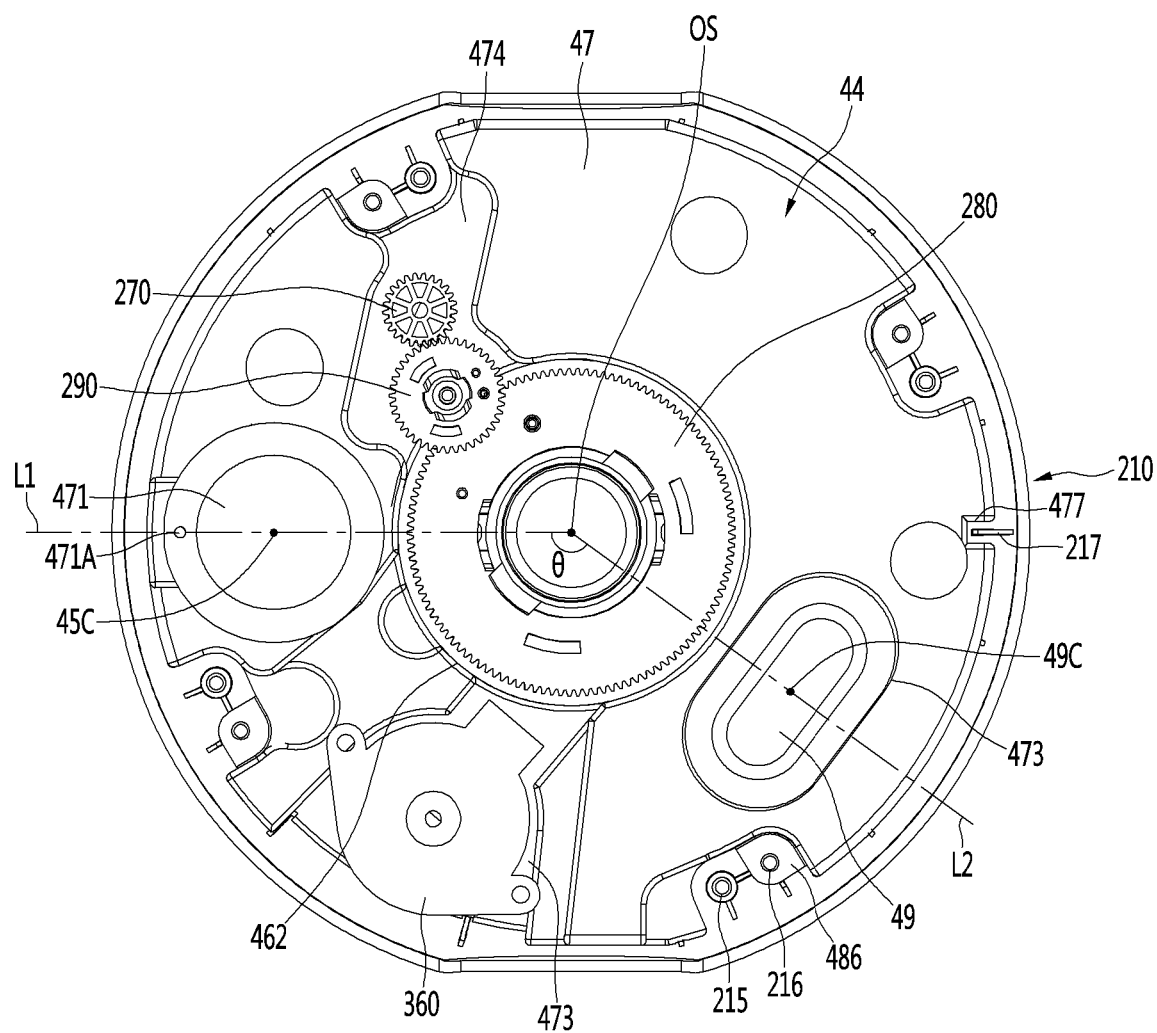
FIG. 11 is a plan view illustrating a spin housing, the speaker, and a motor and gears disposed on the speaker according to an embodiment.

The speaker (or speaker assembly) 44 may include a speaker unit (or speaker) 45 (see FIG. 10) and an arc or annular enclosure 46 in which the speaker 45 is mounted and which is formed along the circumferential direction of the spin body 200. The enclosure 46 may not form a part of the exterior of the robot 1. The speaker 45 may include an actuator that produces sound. The enclosure 46 may be separable from the spin body 200. The enclosure 46 may be manufactured independently from the spin body 200, and assembled with and within the spin body 20. The detailed configuration of the speaker 44 will be described later in detail.

In addition, a tilting motor 360, which will be described later, may be accommodated in the space S2 inside the spin body 200. In this case, the spin housing 210 and the spin cover 220 may function as a protective cover for protecting the interface and the tilting motor 360, which are accommodated in the space S2.

A portion of the spin housing 210 may be exposed to the outside. A portion of the spin housing 210 may be seen through the lower end of the tilting housing 310, which will be described later, and the spin housing 210 may form a portion of the outer appearance of the communication robot.

The spin housing 210 may have a shape such that the upper surface thereof is opened and the size thereof is reduced toward the lower portion. The outer surface of the spin housing 210 may be convex toward the outside. The upper end diameter of the spin housing 210 may be larger than the lower end diameter of the spin housing 210.

The spin cover 220 may be in the form of a plate as a whole, may be mounted on the upper end of the spin housing 210, and may be inserted into the spin housing 210 to couple with the spin housing 210 inside the spin housing 210. The spin cover 220 may cover the opened upper surface of the spin housing 210. The shape of the spin cover 220 may correspond to the shape of the upper end of the spin housing 210. For example, the spin cover 220 may have a roughly disc shape.

The spin cover 220 may include tilting shaft supporters 240 and 242 for rotatably supporting a tilting shaft OT connected to the tilting body 300. The tilting shaft supporters 240 and 242 may be arranged on the upper surface of the spin cover 220. The pair of tilting shaft supporters 240 and 242 may be spaced apart from each other in the horizontal direction and the tilting shaft OT may be rotatably supported by the tilting shaft supporters 240 and 242.

The robot 1 may further include the spin cover 220, and more particularly, a drive PCB 230 provided on the spin cover 220. The drive PCB 230 may be seated on the upper surface of the spin cover 220. In other words, the drive PCB 230 may be arranged horizontally on the upper surface of the spin cover 220.

The drive PCB 230 may be smaller than the spin cover 220 and may only cover a portion of the upper surface of the spin cover 220. The area of the drive PCB 230 may be less than half the area of the spin cover 220.

The drive PCB 230 may control at least one electrical component mounted on the spin cover 220. For example, the drive PCB 230 may control a spin motor 260 and a tilting motor 360 by being electrically connected to the spin motor 260 and the tilting motor 360, which may be provided on the spin body 200.

Since the spin motor 260, the tilting motor 360, and the drive PCB 230 may each be mounted on the spin body 200, when the spin body 200 is rotated, the spin motor 260, the tilting motor 360, and the drive PCB 230 all rotate collectively about the rotation axis OS of the spin body 200. Therefore, relative movement does not occur between the spin motor 260, the tilting motor 360, and the drive PCB 230, and tangling and twisting of a connection member connecting the drive PCB 230 and the respective motors 260 and 360 may not occur.

The spin mechanism 250 may rotate the spin body 200 with respect to the base 100. The spin mechanism 250 may include a spin motor 260, a spin drive gear 270, and a spin driven gear 280. The spin mechanism 250 may further include a spin intermediate gear 290. The spin motor 260 may provide power to rotate the spin body 200 relative to the base 100.

The spin motor 260 may be provided on the spin cover 220. More specifically, the spin motor 260 may be provided on an upper surface of the spin cover 220. The drive shaft of the spin motor 260 may protrude vertically below the spin motor 260. The drive shaft of the spin motor 260 may protrude toward the space S2 inside the spin body 200.

The spin motor 260 may be provided between the spin cover 220 and a tilting base 320 described later. In other words, the spin motor 260 may be positioned between the upper surface of the spin cover 220 and a lower surface of the tilting base 320. The spin motor 260 may be protected by the spin cover 220 and the tilting base 320.

The spin drive gear 270 may be connected to the drive shaft of the spin motor 260 in the space S2 inside the spin body 200. The spin drive gear 270 may be rotated inside the spin body 200 and may be protected by the spin body 200. The spin drive gear 270 may hang on the drive shaft of the spin motor 260. The spin drive gear 270 may be rotated by the spin motor 260 under a lower surface of the spin cover 220.

The spin driven gear 280 may be fixed to the base 100. The spin driven gear 280 may be a fixed gear which is fixedly mounted on the spin body connector 120 of the base 100. The spin mechanism 250 may mesh the spin drive gear 270 with the spin driven gear 280. In this case, the spin drive gear 270 may be rotated while revolving around the outer circumference of the spin driven gear 280.

The spin mechanism 250 may be configured such that the spin drive gear 270 is not directly engaged with the spin driven gear 280 but the spin drive gear 270 and the spin driven gear 280 are connected through at least one spin intermediate gear 290. The spin intermediate gear 290 may be rotatably connected to the spin cover 220. The intermediate gear 280 may be positioned below the lower surface of the spin cover 220. In other words, the spin intermediate gear 290 may be accommodated in the space S2 of the spin body 200, like the spin drive gear 270.

The spin intermediate gear 290 may transmit power between the spin drive gear 270 and the spin driven gear 280. The spin intermediate gear 290 may be rotated while revolving around the outer circumference of the spin driven gear 280.

The tilting body 300 may include a tilting housing 310 and a tilting base 320. The tilting housing 310 may form an outer appearance of the robot 1 and may be larger than the spin housing 210. Accordingly, the tilting housing 310 may be referred to as an outer case.

The lower surface of the tilting housing 310 can be opened and the upper space S3 (see FIG. 16) can be formed therein. The tilting base 320 can be accommodated in the upper space S3 of the tilting housing 310.

The tilting housing 310 may cover at least a portion of the outer circumference of the spin body 200. More specifically, the spin cover 220 may be positioned inside the tilting housing 310, and the lower inner surface of the tilting housing 310 may face the outer circumferential surface of the spin housing 210.

The tilting housing 310 may be composed of a combination of a plurality of members, and a plurality of housings that are positioned back and forth, left and right may be coupled to each other. For example, the tilting housing 310 may include a first tilting housing 311 and a second tilting housing 312 coupled to the first tilting housing 311, and an upper space S3 may be formed between the first tilting housings 311 and the second tilting housings 312. The first tilting housing 311 and the second tilting housing 312 may be coupled to the tilting base 320, respectively.

In a case where the first tilting housing 311 is a front tilting housing, the second tilting housing 312 may be a rear tilting housing coupled to the rear end of the first tilting housing 311, and in a case where the first tilting housing 311 is a left tilting housing, the second tilting housing 312 may be a right tilting housing coupled to the right end of the first tilting housing 311. The interface module 400 may be disposed on the tilting housing 310. For example, the interface module 400 may be mounted on the first tilting housing 311. The interface module 400 may be positioned above the tilting base 320.

The tilting base 320 may be protected by the tilting housing 310 by being accommodated in the upper space S3 of the tilting housing 310. The tilting base 320 may be connected to the tilting shaft OT and rotated together with the tilting shaft OT. The tilting base 320 may include a tilting shaft connection portion or connector 321 to which a tilting shaft OT is connected. The tilting shaft connection portion 321 may be formed at a lower portion of the tilting base 320. The tilting shaft OT may extend in the horizontal direction and may be connected to the tilting shaft connection portion 321.

The tilting shaft OT may be connected to the tilting base 320 and the tilting base 320 may be coupled to the tilting housing 310. When the tilting shaft OT is rotated, the tilting base 320 and the tilting housing 310 may be tilted while being rotated together around the tilting shaft OT.

The tilting base 320 may include connection portions or lips 324 and 325 connected to the inside of the tilting base 320. A first connection portion or lip 324 connected to the inside of the first tilting housing 311 may be formed at a first side of the tilting base 320, and a second connection portion or lip 324 connected to the inside of the second tilting housing 312 may be formed at a second side of the tilting base 320.

The robot 1 may further include an intermediate PCB 340 provided on the tilting base 320. The intermediate PCB 340 may be seated on the upper surface of the tilting base 320. The intermediate PCB 340 may be placed horizontally on the upper surface of the tilting base 320.

The tilting base 320 may include a PCB mounting portion 323 on which the intermediate PCB 340 is mounted. The PCB mounting portion 323 may be formed on the upper surface of the tilting base 320. The intermediate PCB 340 may be smaller in size than the tilting base 320 and may cover a portion of the upper surface of the tilting base 320. The area of the intermediate PCB 340 may be less than half of the upper surface area of the tilting base 320.

A battery 34 may be mounted on the tilting base 320. In other words, a battery mounting portion (or battery mount) 322 on which the battery 34 is mounted may be formed on the tilting base 320. The battery mounting portion 322 may be formed on the upper surface of the tilting base 320. The battery mounting portion 322 may be a pocket into which the battery 34 can be inserted and accommodated. A battery cover 35 may be coupled to the tilting base 320 to prevent the battery 34 accommodated in the battery mounting portion 322 from being removed arbitrarily.

The tilting mechanism 350 may include a tilting motor 360, a tilting drive gear 370 whose lower portion or end is connected to the tilting motor 360, and a tilting driven gear 380 which is connected to the tilting shaft OT or the tilting body 300 and receives an input from the tilting drive gear 370. The tilting motor 360 may provide power to tilt the tilting body 300 about the tilting shaft OT.

The tilting motor 360 may be provided below the spin cover 220, and the tilting driven gear 380 may be positioned above the spin cover 220. The power of the tilting motor 360 may be transmitted to the tilting driven gear 380 through the tilting drive gear 370.

The tilting drive gear 370 may be connected to the tilting motor 360 and rotated. The tilting drive gear 370 may be a worm gear vertically orientated. The tilting drive gear 370 may be provided vertically on the upper side of the spin cover 220 so as to be connected to the tilting motor 360.

A lower rotation shaft including the lower end of the tilting drive gear 370 may be connected to the tilting motor 360 and an upper rotation shaft including the upper end of the tilting drive gear 370 may be rotatably supported by a gear supporter 390 which is described later. The tilting driven gear 380 may be positioned above the spin cover 220 and connected to at least one of the tilting shaft OT and the tilting body 300.

The tilting driven gear 380 may be a spur gear which may be rotated about the tilting shaft OT. The tilting driven gear 380 may be connected to at least one of the tilting shaft OT and the tilting base 320 to tilt the tilting body 300.

The robot 1 may further include a gear supporter 390 to which the tilting drive gear 370 is rotatably connected. The gear supporter 390 may be mounted on the spin cover 220 and may rotatably support the tilting drive gear 360. The gear supporter 390 may be connected to an upper portion of the tilting drive gear 370.

The speaker 44 may include a speaker unit (or speaker) 45 and an enclosure 46 on which the speaker unit 45 is mounted. The speaker unit 45 may generate sound, and the speaker unit 45 may include a magnet, a voice coil which is vibrated by the magnetic field of the magnet, and a vibration plate attached to the voice coil to vibrate and generate sound. The vibration plate may be referred to as a sound emission portion 45A. Since the configuration of the speaker unit 45 is well-known in the art, detailed description thereof is omitted.

The speaker unit 45 may emit sound in a downward direction. The speaker unit 45 may be arranged such that the sound emission portion 45A of the speaker unit 45 faces downward. The speaker unit 45 may be mounted on the enclosure 46 and accommodated therein. The speaker unit 45 may be mounted on a speaker unit mounting hole (or speaker mount hole) 484 of the enclosure 46. The enclosure 46 may be a shield type enclosed enclosure.

The inner space S4 (see FIG. 16) of the enclosure 46 may function as an echoing space, and the enclosure 46 may function as an echo box. The sound quality generated from the speaker 44 by the enclosure 46 may thus be improved.

The enclosure 46 may be formed in an annular shape. In other words, an opening portion (or opening) 462 extending in the up and down or vertical direction may be formed at a center portion of the enclosure 46. The opening 462 may include an upper opening 472 and a lower opening 482, which will be described later.

A portion of the base 100 may pass through the opening 462 and more particularly the fixed body 124 (see FIG. 16) of the base 100 may pass through. The inner circumference of the enclosure 46, that is, the inner circumference of the opening 462, may face the outer circumference of the fixed body 124. The center axis of the opening 462 may coincide with the rotation axis OS (see FIGS. 5 to 7) of the spin body 200.

The enclosure 46 may be provided in the space S2 inside the spin housing 210. The size of the enclosure 46 may be smaller than the size of the spin housing 210.

As the enclosure 46 may have a shape of an annular shape along the circumference of the spin housing 210, wherein the space allows the sound generated by the speaker unit 45 to echo therein, the sound of the speaker 44 may be evenly emitted all the way, and sound may be smoothly transmitted to the opposite side of the speaker unit 45 with respect to the opening portion 462. In other words, smooth sound transmission may be achieved regardless of the position of the user.

The enclosure 46 may include a lower body 48 which has an opened upper surface and an upper body 47 which covers the opened upper surface of the lower body 48. The echoing space S4 may be formed in the lower body 48 and an upper body 47 may cover the echoing space S4 in the upper side. In other words, the echoing space S4 may be enclosed at least by the lower body 48 and the upper body 47.

The lower body 48 may have a shape in which the upper surface is opened and the size thereof decreases toward the lower side. The circumferential surface of the lower body 48 may protrude toward the outside.

The lower body 48 may include the speaker unit mounting hole 484 on which the speaker unit 45 is mounted. The speaker unit mounting hole 484 may be formed between the inner circumference and the outer circumference of the lowerbody 48. The speaker unit mounting hole 484 may be provided in the vertical direction. The sound output unit 45A of the speaker unit 45 may be positioned in the speaker unit mounting hole 484A and may emit sound downward.

The lower body 48 may include a first hollow body 481. The diameter of the first hollow body 481 may be reduced toward the lower portion thereof. The first hollow body 481 may include an outer circumferential surface of the lower body 48. The lower body 48 may further include a second hollow body 483. The second hollow body 483 may extend from a lower end of the first hollow body 481 toward the echoing space S4.

The second hollow body 483 may include a lower opening portion 482 at a central portion thereof with through which a portion of the base 100 passes. The lower opening portion 482 may pass through the lower hollow body 483 in the vertical direction.

The upper body 47 may have a shape of an annular plate body as a whole, may be mounted on the upper end of the lower body 48, or may be inserted into the lower body 48 to couple with the lower body 48. The upper body 47 may cover the opened upper surface of the lower body 48. The shape of the upper body 47 may correspond to the shape of the upper end of the lower body 48.

The speaker unit accommodation portion or housing 471 may be formed in the upper body 47. The speaker unit accommodation housing 471 may be formed by protruding a portion of the upper surface of the upper body 47 upward. The speaker unit accommodating housing 471 may cover an upper side of the speaker unit 45 and the speaker unit 45 may be accommodated in the speaker unit accommodating portion 471.

As depicted by FIGS. 8 to 12, the upper body 47 may have a plurality of holes on its upper surface. Some components may be mounted on the upper body 47, such that the holes on the upper body 47 are blocked by the mounted components. The speaker unit 45 may block the speaker unit mounting hole 484 of the lower body 48 of the enclosure 46. Accordingly, the echoing space S4 may be substantially sealed by the enclosure, the speaker unit 45 blocking the hole 484, and other component blocking the plurality of holes on the upper body 47.

An electric wire hole 471A may be formed in the speaker unit accommodation housing 471. The speaker unit 45 may be connected to at least one of the intermediate PCB 340 and the drive PCB by an electric wire, and the electric wire may pass through the electric wire hole 471A formed in the speaker unit accommodation portion 471 and be connected to the speaker unit 45.

An upper opening portion or hole 472 through which a portion of the base 100 passes may be formed at a center of the upper body 47. The upper opening portion 472 may pass through the upper body 47 in the vertical direction. The upper opening hole 472 may be positioned on the upper side of the lower opening hole 482 formed in the lower body 48 and may communicate with each other. The lower end of the upper opening hole 472 and the upper end of the lower opening hole 482 may coincide with each other. The speaker may further include a passive radiator 49. The passive radiator 49 may reinforce the bass of the sound generated from the speaker 44. The passive radiator 49 may have a cone shape.

The passive radiator 49 may be mounted on the upper body 47. The upper body 47 may include a passive mounting hole 476 on which a passive radiator may be mounted, and the passive mounting hole 476 may pass through the upper surface of the upper body 47 in the vertical direction.

The passive radiator 49 may be positioned apart from the speaker unit 45. A center of the speaker unit 45 and a center of the passive radiator 49 may form a predetermined angle θ with respect to the rotation axis OS of the spin body 200. The passive radiator 49 may be located at a position where the angle θ is greater than 90 degrees.

A first virtual line L1 connecting the center 45C of the speaker unit 45 and the rotation axis OS of the spin body 200 in the horizontal direction may be defined, and a second virtual line L2 connecting the center 49C of the passive unit 49 and the rotation axis OS of the spin body 200 in the horizontal direction may be defined. In this case, the angle θ formed by the speaker unit 45 and the passive radiator 49 with respect to the rotation axis OS of the spin body 200 means the smaller angle out of two angles formed by the first virtual line L1 and the second virtual line L2.

The upper body 47 may have a motor avoiding portion or cut out 473 that prevents interference with the tilting motor 360. The motor cut out 473 may be positioned between the speaker unit accommodation housing 471 and the passive mounting hole 476 in the circumferential direction of the upper body 47. The motor cut out 473 may be formed by partially recessing the upper surface of the upper body 47 downward and the tilting motor 360 may be disposed on the motor avoiding portion 473.

The upper body 47 may include a gear avoiding portion or groove 474 that prevents interference with gears included in the spin driving mechanism 250 (see FIG. 8). For example, the gear avoiding groove 474 may avoid interference with the spin drive gear 270 and the spin intermediate gear 290. The gear avoiding groove 474 may be positioned on the opposite side of the motor cut out 473 in the circumferential direction of the upper body 47 with respect to the speaker unit accommodation housing 471.

The gear avoiding groove 474 may be formed such that a portion of the upper surface of the upper body 47 is recessed downward. The gear avoiding portion 474 may include a spin drive gear avoiding portion or groove 478 and a spin intermediate gear avoiding portion or groove 479. The spin drive gear avoiding groove 478 and the spin intermediate gear avoiding groove 479 may be recessed to different depths. A spin drive gear 270 may be accommodated in the spin drive gear avoiding groove 478 and a spin intermediate gear 490 may be accommodated in the spin intermediate gear avoiding groove 479.

The spin intermediate gear avoiding groove 479 may include a first intermediate gear avoiding portion or groove 479A and a second intermediate gear avoiding portion or groove 479B in which a portion of the first intermediate gear avoiding groove 479A is recessed downward. A first intermediate gear 292 (see FIG. 15) and a second intermediate gear 294 (see FIG. 15), which will be described later, may be accommodated in the first intermediate gear avoiding groove 479A and the second intermediate gear avoiding groove 479B, respectively.

The spin housing 210 may have a shape in which the upper surface is opened and the diameter decreases toward the lower portion. The outer surface of the spin housing 210 may be convex toward the outside. The outer diameter of the upper end 210A of the spin housing 210 may be larger than the outer diameter of the lower end 210B of the spin housing 210. The spin housing 210 may include an upper hollow body 211. The upper hollow body 211 may have a space S2 in which the tilting motor 360 and the speaker 44 may be accommodated, and the diameter may decrease toward the lower portion.

The shape of the upper hollow body 211 may correspond to a shape of the first hollow body 481 of the lower body 48 of the enclosure 46. The inner circumferential surface of the upper hollow body 211 may surround the outer circumferential surface of the first hollow body 481.

The spin housing 210 may further include a lower hollow body 213. The lower hollow body 213 may extend from the lower end of the upper hollow body 211 toward the space S2 formed in the upper hollow body 211. The lower hollow body 213 may correspond to a shape of the second hollow body 483 of the lower body 48 of the enclosure 46. The lower hollow body 213 may be positioned below the second hollow body 483.

A base through-hole 212 passing through a portion of the base 100 may be formed at the center of the lower hollow body 213. The base through-hole 212 may vertically penetrate the lower hollow body 213. The base through-hole 212 may be positioned below the opening portion 462 formed in the enclosure 46 and may communicate with the opening portion 462. The diameter of the base through-hole 212 may be larger than the diameter of the opening portion 462.

The spin housing 210 may include a sound hole 214 through which the sound generated from the speaker 44 may exit the spin body 200. The sound hole 214 may be formed at the lower end of the spin housing 210. The sound hole 214 may have an elongated shape in the circumferential direction of the spin housing 210.

The sound hole 214 may be formed between the upper hollow body 211 and the lower hollow body 213. A plurality of sound holes 214 may be formed in the spin housing 210 and a plurality of sound holes 214 may be spaced from each other in the circumferential direction of the spin housing 210. The spin housing 210 may include a plurality of bridges connecting the upper hollow body 211 and the lower hollow body 213, and the sound holes 214 may be formed between the adjacent bridges in the circumferential direction.

The spin housing 210 may include a cover fastening portion or boss 215 for fastening to the spin cover 220. The cover fastening boss 215 may be fastened to the housing fastening portion 220A (see FIGS. 13 to 15) formed on the spin cover 220.

The cover fastening boss 215 may be formed on the inner surface of the upper hollow body 211. The cover fastening boss 215 may include a fastening boss protruding upward from the inner surface of the spin housing 210 and may be fastened to the housing fastening portion or boss 220A of the spin cover 220 by a fastening member such as a screw. However, the configuration of the cover fastening boss 215 is not limited thereto. A plurality of cover fastening bosses 215 which are spaced apart from each other by a predetermined distance along the circumferential direction of the spin housing 210 may be provided.

The enclosure 46 may include an outer avoiding portion or cut-out 465 which avoids interference with the cover fastening boss 215 and the housing fastening portion 220A. The cover fastening boss 215 and/or the housing fastening portion 220A may be positioned within the outer avoiding cut out 465.

The outer avoiding cut out 465 may be recessed inward from the outer circumference of the enclosure 46 in the radial direction. When there are a plurality of cover fastening bosses 215, a plurality of outer avoiding cut outs which are spaced apart from each other by a predetermined distance along the circumferential direction of the spin housing 210 may be provided. The outer avoiding cut out 465 may include a first outer avoiding portion or cut out 475 formed on the upper body 47 and a second outer avoiding portion or cut out 485 formed on the lower body 48.

The first outer avoiding cut out 475 may be recessed inward from the outer circumference of the upper body 47 in the radial direction and the second outer avoiding cut out 485 may be recessed inward from the outer circumference of the lower body 48 in the radial direction. The second outer avoiding cut out 485 may be positioned below the first outer avoiding cut out 475 and the lower end of the first outer avoiding cut out 475 and the upper end of the second outer avoiding cut out 485 may be coincident with each other.

The spin housing 210 may include an enclosure fastening portion or boss 216 for fastening to the enclosure 46. The enclosure fastening boss 216 may be fastened to the spin housing fastening portion or tab 486 formed in the enclosure 46.

The enclosure fastening boss 216 may be formed on the inner surface of the upper hollow body 211. The enclosure fastening boss 216 may be adjacent to the cover fastening boss 215. A plurality of the enclosure fastening bosses 216 which are spaced apart from each other by a predetermined distance along the circumferential direction of the spin housing 210 may be provided.

The spin housing fastening tab 486 may be formed on the outer avoiding cut out 465 of the enclosure 46. The spin housing fastening tab 486 may be formed on the first outer avoiding cut out 475 or the second outer avoiding cut out 485 of the enclosure 46.

The spin housing fastening tab 486 may not interfere with the cover fastening boss 215 and the housing fastening boss 220A. In other words, the spin housing fastening tab 486 may not overlap with the cover fastening boss 215 in the vertical direction.

When a plurality of the outer avoiding cut outs 465 is provided, a plurality of spin housing fastening tabs 486 which are formed on the outer avoiding cut outs 465, respectively may be provided. The number of spin housing fastening tabs 486 and the number of enclosure fastening bosses 216 may be the same.

The enclosure fastening boss 216 may include a fastening boss protruding upward from the inner surface of the spin housing 210. The spin housing fastening tab 486 may include a protrusion portion horizontally protruding to the inside of the outer avoiding cut out 485, and a fastening hole formed in the protruding portion in the vertical direction. A fastening member such as a screw may be fastened to the fastening boss through the fastening hole. However, the configurations of the enclosure fastening boss 216 and the spin housing fastening tab 486 are not limited thereto.

The spin housing 210 may include fixing ribs 217 and the enclosure 46 may include insertion grooves 477 and 487 into which the fixing ribs 217 are inserted. The fixing ribs 217 may vertically protrude from the inner surface of the spin housing 210. The fixing ribs 217 may vertically protrude from the inner surface of the upper hollow body 211.

The insertion grooves 477 and 487 may be recessed inward from the outer circumference of the enclosure 46 in the radial direction. The width of the insertion grooves 477 and 487 may be equal to or greater than the thickness of the fixing ribs 217.

The insertion grooves 477 and 487 may include an upper insertion groove formed in the upper body and a lower insertion groove formed in the lower body. The upper insertion groove 477 may be positioned on the upper side of the lower insertion groove 487 and the lower end of the upper insertion groove 477 may coincide with the upper end of the lower insertion groove 487. By inserting the fixing ribs 217 into the insertion grooves 477 and 487, the user may easily grasp the correct installation direction of the enclosure 46 and it may be possible to prevent the enclosure 46 from being rotated and shaken with respect to the spin housing 210.

Figure 12:
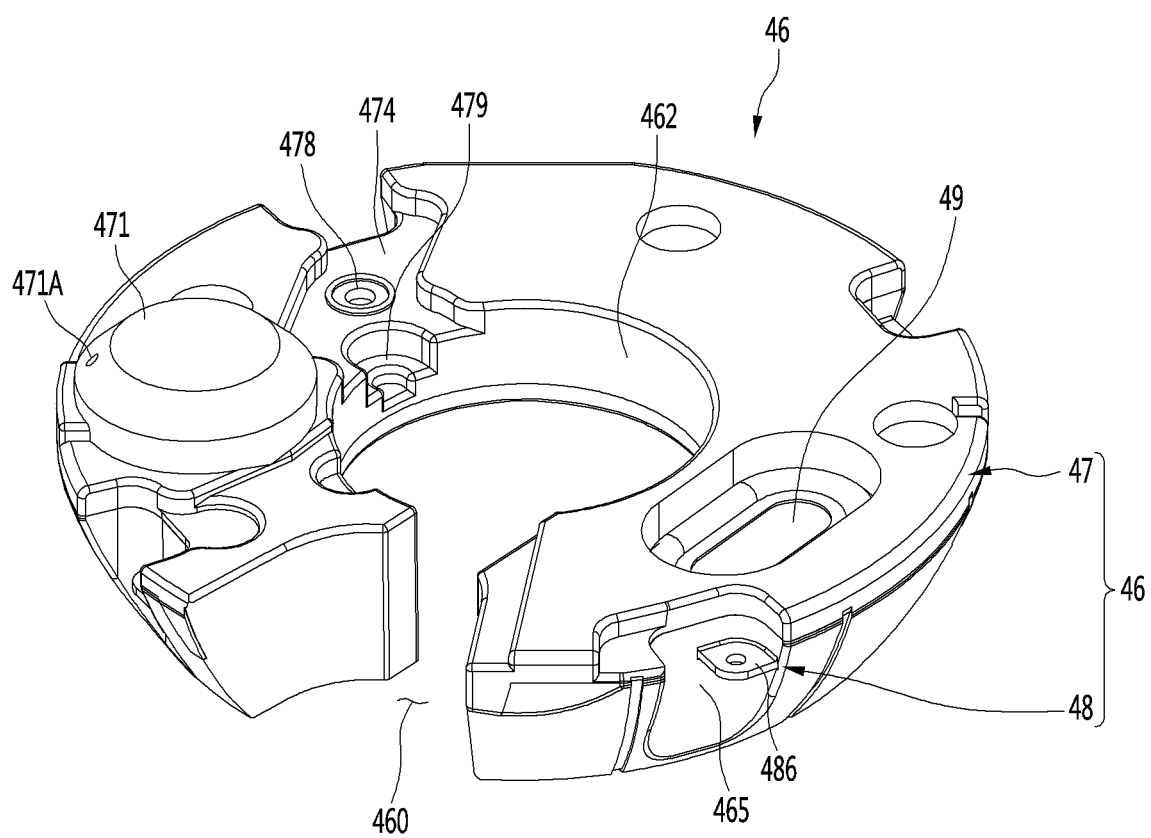
FIG. 12 is a perspective view illustrating a speaker according to another embodiment.

Referring to FIG. 12, the enclosure 46 according to an embodiment may have an arc shape that is not annular. In this case, the angle formed by a first and second end of the enclosure 46 with respect to the central axis OS (see FIG. 11) of the spin body 200 may be less than 90 degrees.

The first end and the second end of the enclosure 46 may be spaced apart from each other, and the space 460 between the first end and the second end thereof may function as any of the above-described avoiding portions or cut outs. For example, the space 460 may function as the motor cut out, and the tilting motor 360 may be accommodated between the first end and the second end of the enclosure 46.

Figure 13:
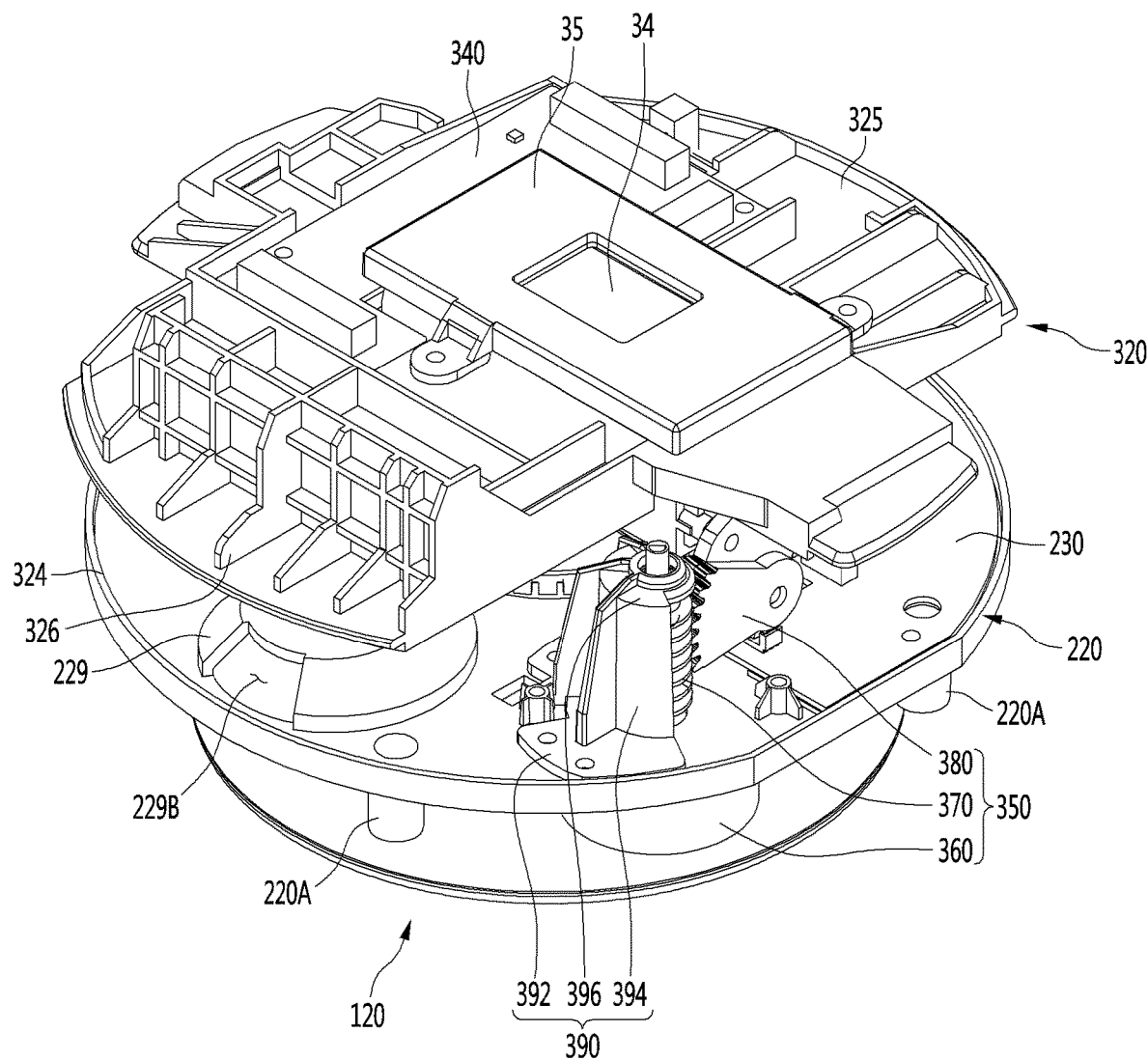
FIG. 13 is a perspective view illustrating a base, a spin cover, a tilting mechanism, and a tilting base according to an embodiment.
Figure 14:
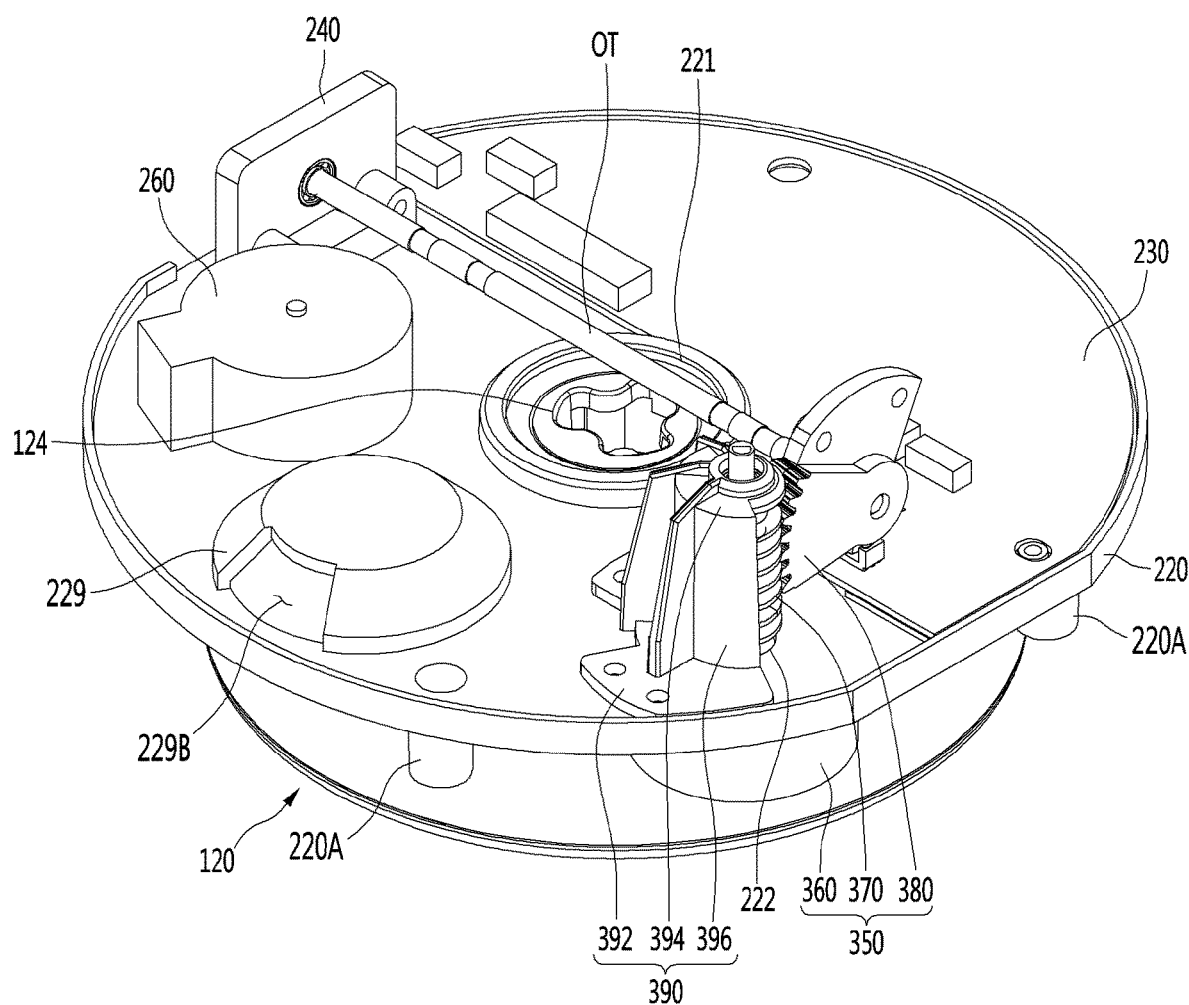
FIG. 14 is a perspective view illustrating when the tilting base illustrated in FIG. 13 is separated.
Figure 15:
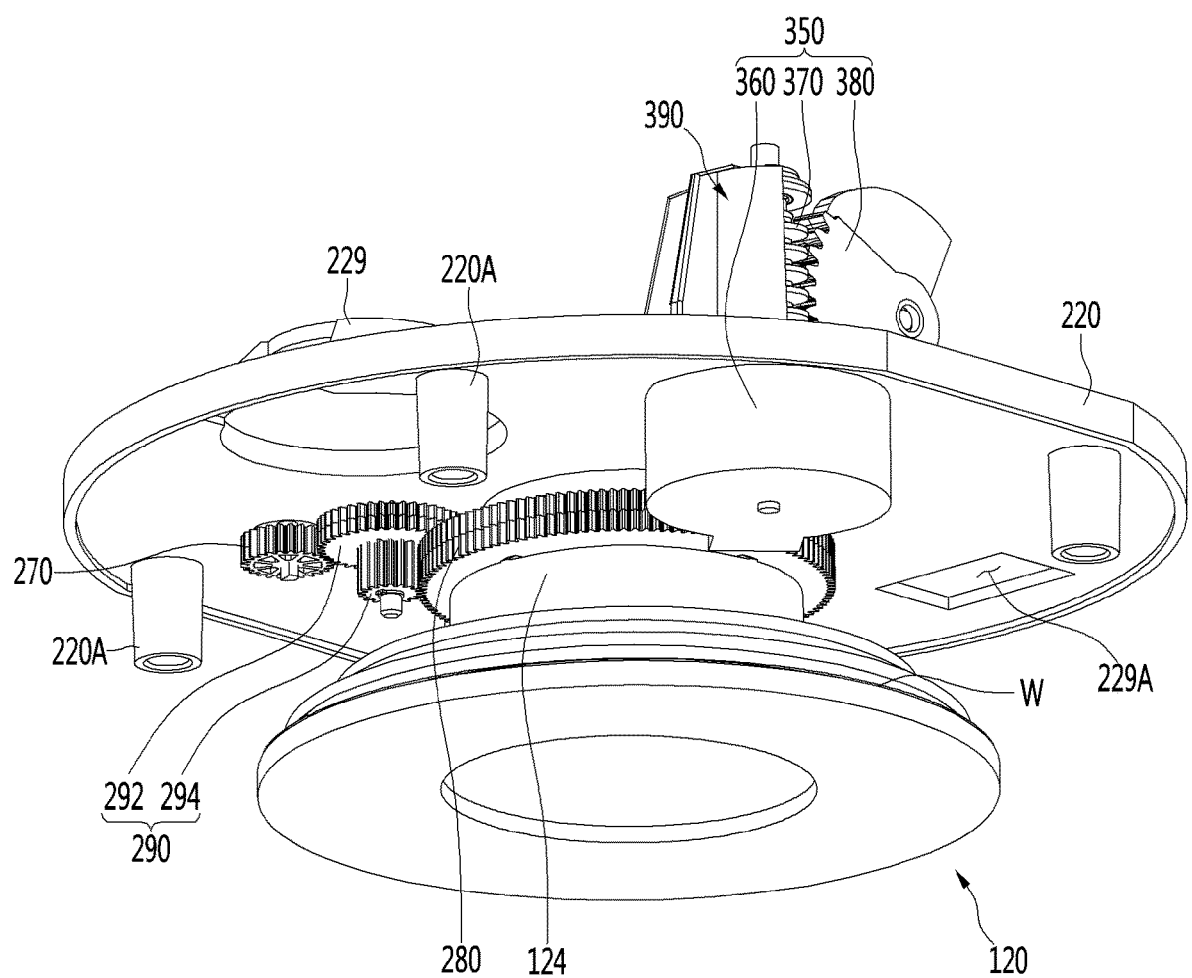
FIG. 15 is a bottom perspective view illustrating the base, the spin cover, the spin mechanism, and the tilting mechanism according to an embodiment.

Referring to FIGS. 13-15, the drive PCB 230 may be eccentrically provided on one side of the upper surface of the spin cover 220. A spin motor 260, a tilting drive gear 370, a tilting driven gear 380, a gear supporter 390, and the like may be provided on the upper surface of the spin cover 220, and the drive PCB 230 may be eccentrically arranged at a position not interfering with the spin motor 260, the tilting drive gear 370, the tilting driven gear 380, the gear supporter 390, and the like.

The drive PCB 230 may be horizontally disposed. The upper surface of the drive PCB 230 may face the lower surface of the tilting base 320. The drive PCB 230 may be protected by the spin cover 220 and the tilting base 320.

The drive PCB 230 provided on the upper surface of the spin cover 220 and the tilting motor 360 accommodated in the space S2 may be electrically connected by a connection member such as an electric wire, for example. The spin cover 220 may include at least one first through-hole 229A through which a connection member connecting the drive PCB 230 and the tilting motor 360 passes. The first through-hole 229A may be formed below the drive PCB 230 and may be covered by the drive PCB 230. The spin cover 220 may include a protrusion portion (or dome cover) 229 that protrudes upward from the upper surface of the spin cover 220.

The speaker unit accommodation housing 471 (see FIG. 9) formed in the enclosure 46 of the speaker 44 may be accommodated in the protrusion portion 229. The shape of the protrusion portion 229 may correspond to the shape of the speaker unit accommodation portion 471.

At least one of the intermediate PCB 340 and the drive PCB 230 may be connected to the speaker unit 45 of the speaker 44 by a wire. The protrusion portion 229 of the spin cover 220 may include a second through-hole 229B through which the electric wire passes. An electric wire hole 471A (see FIG. 9) formed in the speaker unit accommodation housing 471 may be directed to the second through-hole 229B and the electric wire may pass through the second through-hole 229B and the electric wire hole 471A and may be connected to the speaker unit 45.

The spin cover 220 may include a housing fastening portion or boss 220A which may be fastened to the spin housing 210. The housing fastening boss 220A may be fastened to the cover fastening boss 215 (see FIG. 10) formed in the spin housing 210. The housing fastening boss 220A may protrude downward from the lower surface of the spin cover 220.

A plurality of housing fastening bosses 220A may be provided, and the number of the cover fastening bosses 215 and the number of the housing fastening bosses 220A may be the same.

The housing fastening boss 220A may include a protrusion portion protruding downward from the lower surface of the spin cover and a fastening hole formed in the lower surface of the protrusion so as to penetrate in the vertical direction. The fastening member such as a screw may be fastened to the cover fastening boss 215 through the fastening hole. However, the configuration of the housing fastening boss 220A is not limited thereto.

The spin mechanism 250 may include a spin motor 260, a spin drive gear 270, and a spin driven gear 280. The spin mechanism 250 may further include a spin intermediate gear 290. The spin motor 260 may be accommodated between the outer circumference of the spin cover 220 and a fixed shaft connection portion or hole 221 with respect to the radial direction of the spin cover 220. The fixed shaft connection hole may include a fixed shaft connection bracket to which a fixed shaft 126 may be connected.

The spin motor 260 may be provided on the upper surface of the spin cover 220 and the drive shaft may protrude below the spin motor 220. The spin motor 260 may be arranged between the spin cover 220 and the tilting base 320, and the spin motor 260 may be protected by the spin cover 220 and the tilting base 320. The drive shaft of the spin motor 260 may extend vertically below the spin motor 260. The drive shaft of the spin motor 260 may protrude toward the space S2 inside the spin body 200.

The spin driving gear 270 may be provided in the space S2 inside the spin body 200 and may be connected to the driving shaft of the spin motor 260. The spin drive gear 270 may be suspended from the drive shaft of the spin motor 260. The spin drive gear 270 and the spin motor 260 may be positioned opposite to each other with respect to the spin cover 220.

A through-hole through which at least one of the driving shaft of the spin motor 260 and the rotation axis of the spin driving gear 270 passes may penetrate through the spin cover 220 in the vertical direction. At least one of the drive shaft of the spin motor 320 and the rotation shaft of the spin drive gear 270 may be positioned in the through-hole of the spin cover 220.

The spin driven gear 280 may be fixed to the base 100. The spin driven gear 280 may be a fixed gear fixedly mounted on the fixed shaft 126 of the base 100. The diameter of the spin driven gear 280 may be larger than the diameter of the spin drive gear 270. The spin drive gear 270 may be directly engaged with the spin driven gear 280 and in this case, the spin drive gear 270 may be rotated while revolving around the outer circumference of the spin driven gear 280.

Alternatively, the spin drive gear 270 and the spin driven gear 280 may be connected to each other via the spin intermediate gear 290 without directly engaging the spin drive gear 270 with the spin driven gear 280. The spin intermediate gear 290 may be rotatably connected to the spin cover 220. The spin intermediate gear 290 may be accommodated in the space S2 inside the spin body 200 like the spin drive gear 270.

The spin intermediate gear 290 may transmit power between the spin drive gear 270 and the spin driven gear 280. The spin intermediate gear 290 may rotate while revolving around the outer circumference of the spin driven gear 280.

The spin intermediate gear 290 may include a first intermediate gear 292 engaged with the spin drive gear 270 and a second intermediate gear 294 rotated together with the first intermediate gear 292 and engaged with the spin driven gear 280. The diameter of the first intermediate gear 292 may be larger than the diameter of the second intermediate gear 294 and the rotation shaft of the first intermediate gear 292 and the second intermediate gear 294 may coincide with each other. According to the above-described configuration, it may be possible to prevent the spin body 200 from being rotated too fast when the spin motor 260 is driven and to secure a sufficient torque required for rotating the spin body 200.

The tilting mechanism 350 may include the tilting motor 360 accommodated in the space S2 inside the spin body 200, the tilting drive gear 370 whose lower portion is connected to the tilting motor 360, and the tilting driven gear 380 connected to the tilting shaft OT or the tilting body 300 and engaged with the tilting drive gear 370 on the spin cover 220. The tilting motor 360 may be positioned below the spin cover 220 and the tilting driven gear 380 may be positioned above the spin cover 220. In other words, the tilting motor 360 and the tilting driven gear 380 may be positioned opposite to each other with respect to the spin cover 220. The power of the tilting motor 360 may be transmitted to the tilting driven gear 380 through the tilting drive gear 370.

The spin cover 220 may include a through-hole through which at least one of a driving shaft of the tilting motor 360 and a tilting driving gear 370 passes. The through-hole may pass through the spin cover 220 in the vertical direction, and at least one of the drive shaft of the tilting motor 360 and the tilting drive gear 370 may be positioned in the through-hole 222.

The driving shaft of the tilting motor 360 may be perpendicular to the rotation axis of the tilting shaft OT. More specifically, the tilting shaft OT may be arranged in the horizontal direction, and the driving shaft of the tilting motor 360 may be arranged in the vertical direction.

The driving shaft of the tilting motor 360 may be parallel to the driving shaft of the spin motor 260. The drive shaft of the tilting motor 360 and the drive shaft of the spin motor 260 may extend in the vertical direction and the drive shaft of the tilting motor 360 and the drive shaft of the spin motor 260 may be spaced apart from each other in the horizontal direction. The tilting motor 360 may be positioned between the outer circumference of the spin cover 220 and the fixed shaft connection portion 221 in the radial direction of the spin cover 220.

The tilting drive gear 370 may be connected to the tilting motor 360 and rotated. The tilting drive gear 370 may be a worm gear having a vertical rotation axis. The tilting drive gear 370 may be provided on the upper side of the spin cover 220 to extend in the vertical direction when connected to the tilting motor 360.

The tilting drive gear 370 may include a gear unit having gear teeth formed on the outer circumference thereof in the form of a screw, a lower rotation shaft projecting to the lower portion of the gear unit, and an upper rotation shaft projecting to the upper portion of the gear unit. The gear unit of the tilting drive gear 370 may be engaged with the tilting driven gear 380.

The lower rotation shaft including the lower end of the tilting drive gear 370 may be connected to the tilting motor 360 and the upper rotation shaft including the upper end of the tilting drive gear 370 may be rotatably supported by the gear supporter 390.

The tilting driven gear 380 may be positioned above the spin cover 220 and may be connected to at least one of the tilting shaft OT and the tilting body 300. The tilting driven gear 380 may be a spur gear that rotates about the tilting shaft OT. The tilting driven gear 380 may be connected to at least one of the tilting shaft OT and the tilting base 320 to tilt the tilting body 300.

The gear supporter 390 may be mounted on the spin cover 220 and may rotatably support the tilting drive gear 360. The gear supporter 390 may be connected to an upper portion of the tilting drive gear 370. The gear supporter 390 may include a lower fastening portion (or base) 392 which is fastened to the spin cover 220, a rotation axis support portion (or bearing) 394 which rotatably supports the upper rotation shaft of the tilting drive gear 370, and a connection portion (or cylindrical wall) 396 which connects the lower fastening portion 391 and the rotation axis support portion 394.

The lower fastening portion 392 may be fastened to the upper surface of the spin cover 220. The lower fastening portion 392 may include a fastening hole penetrating in the up and down direction, and a fastening member such as a screw, for example, may be fastened to the spin cover 220 through the fastening hole.

The connection portion 396 may surround the tilting drive gear 370, particularly, a portion of the outer circumference of the gear unit. A space for accommodating the tilting drive gear 370 may be formed in the connection portion 396. The connection portion 396 may protect the tilting drive gear 370 from the opposite side of the tilting driven gear 380. The tilting drive gear 370 may be rotated around an upper rotation shaft and a lower rotation shaft which each extend in the vertical direction in a state of being accommodated in a space formed inside the connection portion 396.

The spin cover 220 may include a fixed shaft connection hole 221 to which the fixed shaft 126 of the base 100 (see FIG. 16) is connected. The fixed shaft connection hole 221 may be formed at the center portion of the spin cover 220. The fixed shaft connection hole 221 may pass through in the vertical direction and be formed in a circular shape. The fixed shaft 126 of the base 100 may be inserted into the fixed shaft connection hole 221 so that the spin cover 220 may be rotatably mounted. The virtual vertical center axis of the fixed shaft connection hole 221 may coincide with the virtual rotational axis OS (FIGS. 5 to 7) of the spin body 200.

Figure 16:
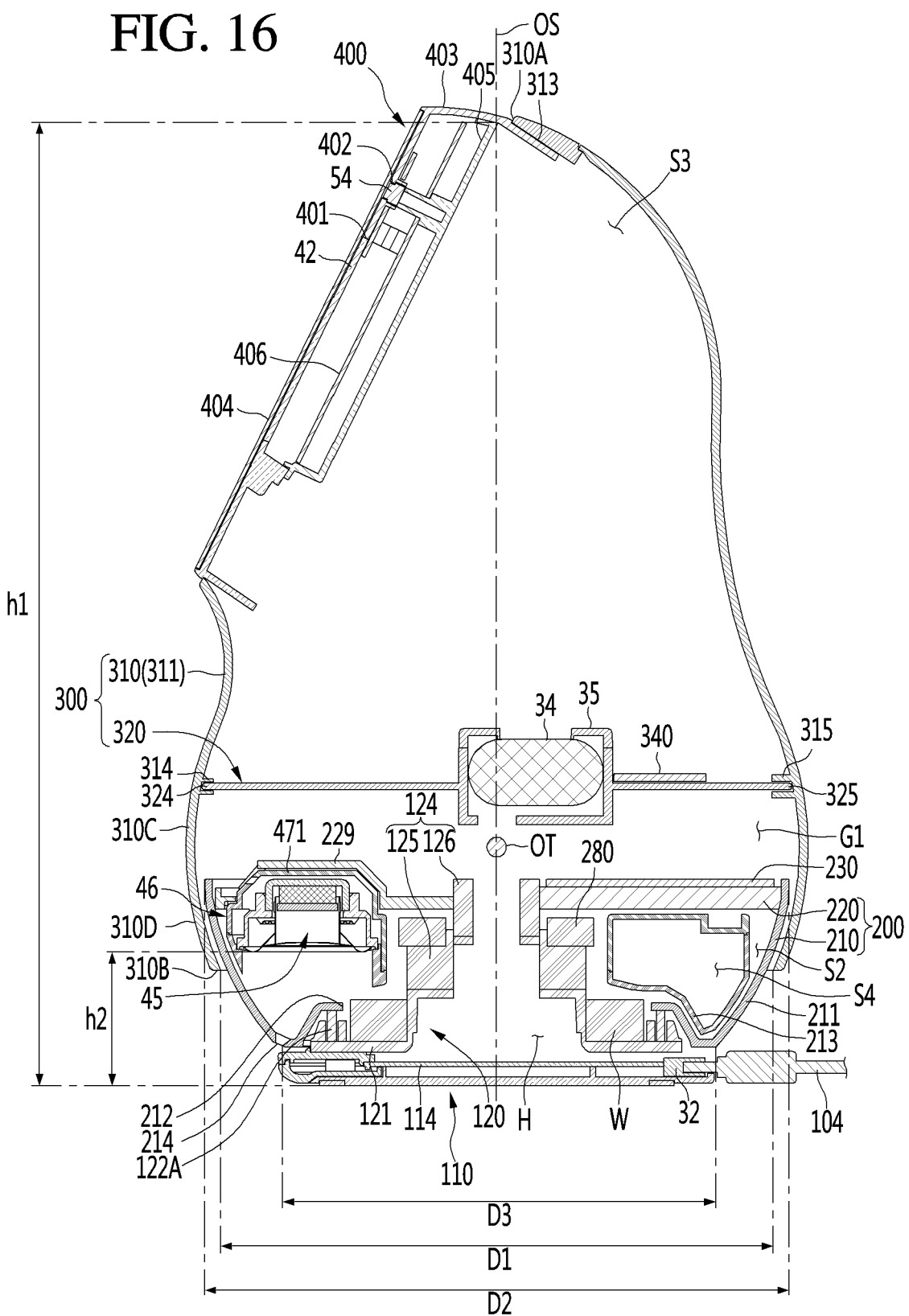
FIG. 16 is a sectional view taken along line A-A in FIG. 4.
Figure 17:
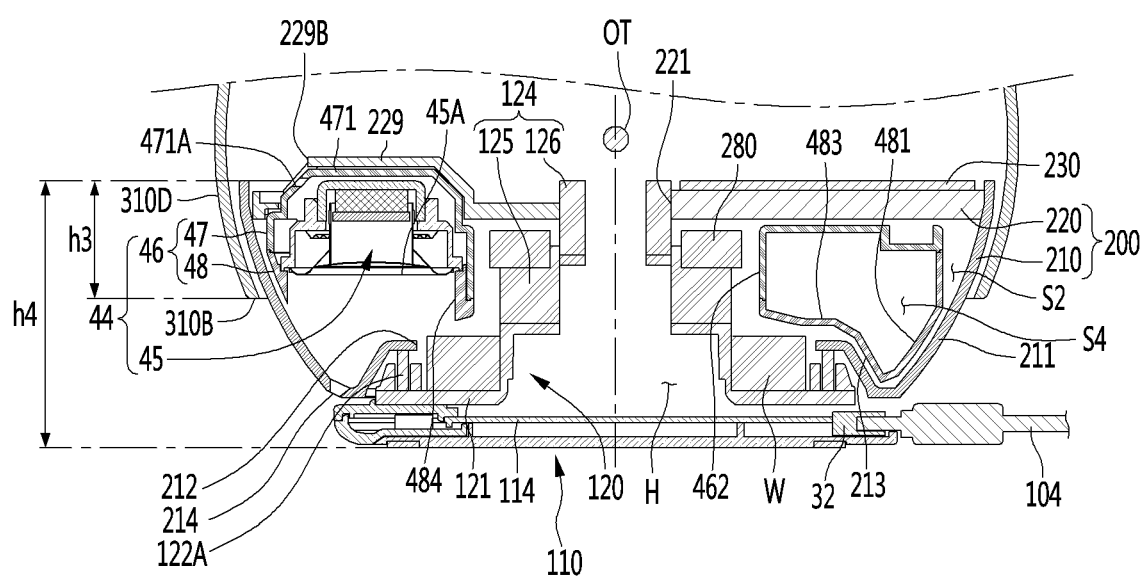
FIG. 17 is an enlarged cross-sectional view of the speaker and its surroundings illustrated in FIG. 16.

Referring to FIGS. 16-17, the base 100 may include a base body 110, and a spin body connection portion or connector 120 which is provided on the base body 110 and to which the spin body 200 is connected in a rotatable manner. The robot 1 may further include a base PCB 114 provided on the base 100. The base PCB 114 may be accommodated on the base body 110. The base PCB 114 may be electrically connected to the power connection portion or connector 32 provided on the base body 110. The power connector 32 may be connected to the power cord 104 to receive power from an external power supply.

The spin body connection portion 120 may include a spin body supporter 121 and a fixed body 124. The spin body supporter 121 may support the spin body 200 in a rotatable manner. The spin body supporter 121 may be provided on the upper surface of the base body 110.

The spin body supporter 121 may include a rolling member 122A which may be in contact with the spin body 200. The rolling member 122A may include at least one of a roller, a ball, and a bearing. The rolling member 122A may be rotatably mounted on the spin body supporter 121. The rolling member 122A may protrude from the upper surface of the spin body supporter 121.

The rolling member 122A may be in contact with the spin body 200, particularly, the spin housing 210, and may help the spin body 200 to be rotated smoothly. A plurality of rolling members 122A may be provided in the spin body supporter 121. The plurality of rolling members 122A may be arranged along the virtual circle and the plurality of rolling members 122A may disperse the load acting on the spin bodies 200 into the base 100, particularly, the spin body supporter 121.

A weight body W which may increase the weight of the base 100 may be provided on the base 100. The weight body W may be heavy compared to a volume thereof and may reduce the entire center of gravity of the robot 1 as much as possible and help the robot 1 not to overturn. The weight body W may be provided on the upper surface of the spin body supporter 121.

The fixed body 124 may include the fixed shaft 126. The fixed shaft 126 may be formed in a hollow cylindrical shape which is vertically erected and may be connected to the fixed shaft connection hole 221 formed in the spin cover 220. The fixed shaft 126 may be inserted into the fixed shaft connection hole 221 and the spin body 200 may be rotated about the fixed shaft 126. In other words, the vertical center axis of the fixed shaft 126 may coincide with the rotation axis OS of the spin body 200.

The fixed body 124 may further include a gear mounting portion or hub 125 which is positioned below the fixed shaft 126 and on which the spin driven gear 280 is mounted. The spin driven gear 280 may be mounted to the gear mounting portion 125 with a fastening member such as a screw. The spin driven gear 280 may be rotated such that the spin driven gear 280 is fixedly mounted on the gear mounting hub 125.

The base PCB 114 and at least one of the drive PCB 230 and the intermediate PCB 340 may be electrically connected by a connection member such as an electric wire, for example. In this case, a hollow (H) through which the connection member passes may be formed in the spin body connection portion 120. The central axis of the hollow H may coincide with the rotational axis OS of the spin body 200.

The outer circumference of the fixed body 124 may face the speaker, more specifically the inner circumference of the enclosure. At least a portion of the fixed body 124 may be positioned within an opening portion 462 formed in the enclosure 46. In addition, the spin driven gear 280 may be positioned in the opening portion 462 formed in the enclosure 46.

The lower hollow body 213 of the spin housing 210 may include a shielding body which extends so that the rolling element or roller 122A is hidden from view from the side and a contact body which extends horizontally at an upper portion of the shielding body and is seated on the rolling body. The base through-hole 212 may be formed on the contact body in a hollow shape and the lower hollow body 213 may be rotatable along a plurality of rolling members 122A in a state where the lower surface of the contact body is in contact with the rolling member 122A. The base 100 may be positioned in the base through-hole 212, and more particularly the spin body connection 120 may be positioned therein.

The upper end 310A of the tilting housing 310 may be higher than the upper end 210A of the spin housing 210, and the tilting housing 310 may cover the upper end 210A of the spin housing 210. The lower end 310B of the tilting housing 310 may be lower than the upper end 210A of the spin housing 210, may be higher than the lower end 210B of the spin housing 210, and the tilting housing 310 may shield a portion of the outer circumference of the spin housing 210.

The tilting housing 310 may include a gap shielding portion 310C for shielding a gap G1 between the tilting base 310 and the spin cover 210. The inner surface of the gap shielding portion 310C of the tilting housing 310 may face the gap G1 between the spin cover 210 and the tilting base 310 and the gap G1 may be shielded at the outside of the gap G1. When the tilting housing 310 includes the gap shielding portion 310C, various components (for example, spin motor 260, tilting drive gear 370, tilting driven gear 380, PCB 230, and the like) positioned in the gap G1 between the tilting base 310 and the spin cover 210 may be protected by the gap shielding portion 310.

The lower portion of the tilting housing 310 may surround the outer peripheral surface of the spin housing 210. The lower portion of the tilting housing 310 may overlap a portion including the upper end 210A of the spin housing 210 in a horizontal direction and the upper end 210A of the spin housing 210 may be hidden from the outside by being covered by the tilting housing 310.

A gap G2 may be formed between the tilting housing 310 and the spin housing 210. The gap G2 may be formed between the inner circumferential surface of the tilting housing 310 and the outer circumferential surface of the spin housing 210. The lower portion of the tilting housing 310 may have a shape in which the inner diameter gradually decreases toward the lower side and the lower end 310B of the tilting housing 310 may overlap with the spin housing 210 in the vertical direction and the horizontal direction. To this end, the lower end inner diameter D1 of the tilting housing 310 may be smaller than the upper outer diameter D2 of the spin housing 210 and larger than the lower end outer diameter D3 of the spin housing 210.

A portion of the tilting housing 310 that overlaps with the spin housing 210 in the vertical direction and the horizontal direction may be a spin housing shielding portion 310D that shields the spin housing 210. The spin housing shielding portion 310D may include a lower end 3106 of the tilting housing 310. Foreign matter such as dust may be minimally penetrated into the robot 1 through the gap G2 between the tilting housing 310 and the spin housing 210 by the spin housing shielding portion 310D.

The tilting base 320 may cover the upper space S3 formed in the tilting housing 310. The speaker unit 45 and the interface module 400 may be eccentric in the same direction with respect to the rotation axis OS of the spin body 200. For example, the speaker unit 45 and the interface module 400 may be eccentrically forward with respect to the rotation axis OS of the spin body 200.

The interface module 400 and the speaker unit 45 may be positioned in front of the virtual rotation axis of the spin body 200. The interface module 400 may be mounted on a front portion of the tilting housing 310 and the display 42 included in the interface module 400 may face forward. The display 42 and the speaker unit 45 may overlap in the vertical direction.

The speaker unit 45 and the display 42 may be disposed eccentrically in the same direction with respect to the rotation axis OS of the spin body 200 so that when the spin body 200 is rotated, the display 42 and the speaker unit 45 may revolve around the rotation axis OS of the spin body 200 and maintain a relative position therebetween. Accordingly, the user may feel audibly that the sound source is positioned in a direction in which the display 45 faces when the robot 1 is rotated and may feel the same sound as the robot actually speaks.

The height h2 from the lower surface of the base 100 to the speaker unit 45 may be less than half the height h1 from the lower surface of the base 100 to the upper end 310A of the tilting housing 310. The height h2 from the lower surface of the base 100 to the speaker unit 45 may be 0.25 times or less than the height h1 from the lower surface of the base 100 to the upper end 310A of the tilting housing 310.

The speaker unit 45 may be disposed at a relatively low position compared to the entire height of the robot 1. Thus, the weight of the speaker 44 including the speaker unit 45 may keep the center of gravity of the robot 1 low, and the overturning of the robot 1 may be prevented.

The vertical distance h3 between the upper end of the spin body 200 and the lower end 310B of the tilting housing 310 may be shorter than the vertical distance h4 between the upper end of the spin body 200 and the sound hole 214. The sound hole 214 may be positioned below the lower end 310B of the tilting housing 310, and thus the sound hole 214 may not be covered by the tilting housing 310 so that loss of sound may be minimized.

The speaker unit 45 may overlap the tilting housing 310 in the horizontal direction. The speaker unit 45 may overlap the spin housing shielding portion 310D in the horizontal direction. Accordingly, the tilting housing 310 may minimize a spread of sound emitted from the speaker unit 45 to other places than the sound hole 214.

According to the embodiment, since the enclosure of the speaker has a shape of an arc or annular shape along the circumferential direction of the spin body, wherein the space allows the sound generated by the speaker to echo therein, the quality of sound transmitted to the user at a specific position may be maintained regardless of the rotation direction of the spin body. Since the inner circumference of the enclosure may face the outer circumference of the fixed body, and the enclosure may be rotated about the fixed body, the echoing space of the sound may be maintained constant without deformation even if the enclosure is rotated.

Since the enclosure may include the upper body and the lower body, the separation of the enclosure may be simplified and the maintenance of the speaker unit may be facilitated. Since the passive radiator may be mounted on the upper body, the bass sound from the speaker (i.e., the sound of a low-frequency range generated by the speaker) may be reinforced.

By the speaker unit accommodation portion formed in the upper body, the enclosure may be compactly formed without increasing the height of the enclosure as a whole, and the position of the speaker unit accommodated in the enclosure may be easily identified. Since the speaker unit accommodation portion may be accommodated in the protrusion portion formed on the spin body, the vertical height of the spin body may not increase as a whole but the spin body may be compact.

Since the spin body may include the spin housing and the spin cover, the disassembling of the spin body may be simplified and thus the easy maintenance of the speaker may be facilitated. Since the enclosure may have the outer avoiding portion that avoids interference with the cover fastening portion and the housing fastening portion, the spin housing and the spin cover may be firmly fastened while maintaining the size of the spin body compact.

Since the fixing rib formed in the spin housing may be inserted into the insertion groove formed in the enclosure, it may be easy to identify the correct installation direction of the enclosure relative to the spin housing, and the enclosure may be prevented from being rotated or vibrated with respect to the spin housing. Since the upper end diameter of the enclosure may be larger than the lower end diameter, the echo of the sound may be concentrated to the lower side thereof facing the sound holes in the spin body.

Since a plurality of sound holes may be spaced apart from each other by a predetermined distance along the circumferential direction of the spin body, smooth sound may be transmitted regardless of the user's position. Since the upper end diameter of the spin body may be larger than the lower end diameter thereof, and a plurality of sound holes may be formed at the lower end of the spin body, sound concentrated in the lower side may be radiated intensely through the sound hole, and the sound hole may not be seen from the front face of the robot and thus the design of the outer appearance of the robot may be improved.

Since the lower end of the outer case may be closer to the sound hole than the upper end of the spin body, the sound holes may not be covered by the outer case so that the sound may be transmitted to the user better without hindrance by the outer case. Since the speaker unit may be positioned lower than half of the entire height of the outer case with respect to the lower surface of the base, the center of gravity of the robot may be lowered by the weight of the speaker including the speaker unit.

Since the speaker unit may overlap the outer case in the horizontal direction, the emission of the sound of the speaker via other places other than the sound holes may be minimized. Since the speaker unit and the interface module may be eccentric to the front of the robot with respect to the virtual rotation axis of the spin body, the user may feel as if the sound is emitted toward the interface module.

Since the enclosure may have a motor avoiding portion that avoids interference with the tilting motor, the internal space of the spin body may be efficiently utilized, and the spin body may be maintained compact. Since the display and the speaker unit may be positioned with a fixed angle difference between them, or in a same radial direction with respect to the virtual rotation axis of the spin body, the display and the speaker unit may revolve about the rotation axis of the spin body when the spin body is rotated, and the relative position between the display and the speaker unit may be maintained. Thus, the user may feel audibly the sound source to be positioned in a direction in which the display faces when the robot is rotated, and the robot may feel the same sound as the robot actually speaks. When the display and the speaker unit overlap in the up and down direction, the position of the display and the speaker unit may be exactly matched with each other, so that the effect of feeling the same sound as the robot actually speaks can increase.

In the robot, an enclosure of a speaker may have a shape of an arc or annular shape along a circumferential direction of a spin body. The space may allow the sound generated by the speaker to echo therein. Thereby, the quality of sound transmitted to the user at a specific position may be maintained regardless of a rotation direction of the spin body. The space may be substantially sealed by the enclosure, the speaker enclosed in the enclosure, and other components mounted on the enclosure.

The robot may include a base; a spin body which is rotatably connected to the base; and a speaker which is accommodated in the spin body and is rotated together with the spin body, in which the speaker includes: a speaker unit which emits sound; and an enclosure of an arc or annular shape in which the speaker unit is accommodated and formed along a circumferential direction of the spin body.

The base may include a fixed body which is extended in an up and down direction and disposed in such a manner that a virtual rotation axis of the spin body passes a center region of the fixed body, and an inner circumference of the enclosure may face the outer circumference of the fixed body. Thereby, even if the enclosure rotates, an echoing space of sound may be maintained constant without deformation, so that sound quality may be maintained.

The enclosure may include: a lower body which has an opened upper surface and on which a speaker unit mounting hole in which the speaker unit is mounted is formed; and an upper body which covers the opened upper surface of the lower body. This may simplify the separation of the enclosure and facilitates the easy maintenance of the speaker unit.

The upper body may include a passive mounting hole on which a passive radiator is mounted. Thereby, the bass of the sound generated by the speaker can be reinforced.

The upper body may include a speaker unit accommodation portion in which the speaker unit is accommodated and protrudes upward from the upper surface of the upper body. Thus, the height of the enclosure in the up and down direction can be made compact without increasing the overall height. The position of the speaker unit accommodated in the enclosure can be easily identified.

The spin body may include a protrusion portion which protrudes upward from an upper surface of the spin body and in which the speaker unit accommodation portion is accommodated. Thus, the height of the spin body in the up and down direction can be formed compactly without increasing the overall height.

The spin body may include a spin housing which has a space for accommodating the speaker therein; and a spin cover which covers an upper side of the space. Thus, the disassembling of the spin body can be simplified and the maintenance of the speaker can be easily performed.

The spin housing may include a cover fastening portion which is fastened to a housing fastening portion formed on the spin cover, and the enclosure may include an outer avoiding portion which is recessed inwardly from the outer circumference of the enclosure in a radial direction and avoids interference with the cover fastening portion and the housing fastening portion. Accordingly, the spin housing and the spin cover can be firmly fastened while maintaining the size of the spin body compact.

The spin housing may have a fixing rib which protrudes inward from the inner surface of the spin housing, and the enclosure may include an insertion groove into which the fixing rib is inserted. This makes it easy to identify the correct installation direction of the enclosure relative to the spin housing and prevent the enclosure from rotating or oscillating with respect to the spin housing.

The enclosure may have an upper end diameter larger than a lower end diameter. Accordingly, the echo of the sound from the speaker can be concentrated downward.

The spin body may include a plurality of sound holes spaced apart from each other by a predetermined distance along a circumferential direction of the spin body. Thereby, smooth sound transmission can be achieved regardless of the position of the user.

The spin body may have an upper end diameter larger than a lower end diameter, and the plurality of sound holes may be formed at a lower end of the spin body. Accordingly, sound concentrated to the lower side can be emitted to the sound hole, and the sound hole cannot be seen on the front face of the robot, and the design of the outer appearance of the robot can be improved.

The robot may further include an outer case which surrounds at least a portion of the outer circumference of the spin body and rotates together with the spin body, and the distance between the upper end of the spin body and the lower end of the outer case in an up and down direction may be shorter than the distance between the upper end of the spin body and the sound hole in the up and down direction. Accordingly, the sound hole is not covered by the outer case, so that the sound can be transmitted to the user better without hindrance by the outer case.

The robot may further include an outer case which surrounds at least a portion of the outer circumference of the spin body and rotates together with the spin body, and the height from the lower surface of the base to the speaker unit may be less than half the height from the lower surface of the base to the upper end of the outer case. Thus, the center of gravity of the robot can be lowered by the weight of the speaker including the speaker unit.

The speaker unit may overlap the outer case in a horizontal direction. Accordingly, the emission of the sound of the speaker to a place other than the sound holes can be minimized.

The robot unit may further include an interface module which is mounted on a front portion of the outer case, and the speaker unit may be eccentric to the front portion from a virtual rotation axis of the spin body. Accordingly, since the positions of the speaker unit and the interface module correspond to each other, the user can feel like that sound is emitted in a direction toward the interface module.

The robot may includes a tilting base which is connected to a tilting shaft connected to the spin body to be tiltable and coupled to the inside of the outer case; and a tilting motor which provides power for rotating the tilting base to the tilting shaft and is accommodated in the spin body. The enclosure may include a motor avoiding portion that avoids interference with the tilting motor. Accordingly, the inner space of the spin body can be efficiently utilized and the spin body can be maintained compact.

Meanwhile, a display and a speaker unit can be positioned with a fixed angle difference, or in a same radial direction with respect to the virtual rotation axis of the spin body. Thus, when the spin body rotates, the display and the speaker unit revolve about the rotation axis of the spin body, and the relative positions between the display and the speaker unit can be maintained. In other words, the user can feel audibly that the sound source is positioned in the direction the display faces when the robot is rotated, and feel the same sound as the robot actually speaks.

A robot may include a base; a spin body which is rotatably connected to the base; an outer case which rotates together with the spin body and has a display; and a speaker unit which is accommodated in the spin body, eccentrically disposed with respect to a virtual rotation axis of the spin body, and revolves about the virtual rotation axis of the spin body, in which the display and the speaker unit can be positioned in front of the virtual rotation axis of the spin body.

The display and the speaker unit may overlap in the up and down direction. Accordingly, since the positions of the display and the speaker unit correspond exactly to each other, the effect of feeling the same sound as the robot actually speaks can increase.

The description above is merely illustrative of the technical idea of the present invention, and various modifications and changes may be made by those skilled in the art without departing from the essential characteristics of the present invention.

Therefore, The embodiments disclosed in the present invention are not intended to limit the technical ideas of the present invention but to illustrate them, and the scope of the technical idea of the present invention is not limited by these embodiments.

The scope of protection of the present invention should be construed according to the following claims, and all technical ideas within the scope of equivalents thereof should be construed as being included in the scope of the present invention.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
    a base;
    a first body connected to the base and configured to be rotatable with respect to the base;
    a speaker accommodated in the first body and configured to be rotated together with the first body; and
    an outer case which surrounds at least a portion of an outer circumference of the first body and rotates together with the first body,
    wherein the speaker includes:
        a speaker unit which emits sound; and
        an annular shaped housing that accommodates at least a part of the speaker unit, the annular shaped housing being accommodated within the first body,
    wherein a height from a lower surface of the base to a bottom of the speaker is less than half of a height from the lower surface of the base to an upper end of the outer case.

2. The robot according to claim 1, wherein the base includes a fixed shaft which extends vertically and defines a rotation axis about which the first body rotates, and
    wherein an inner circumference of the annular shaped housing faces an outer circumference of the fixed shaft.

3. The robot according to claim 1, wherein the annular shaped housing includes:
    a lower body having an opened upper surface and a speaker mounting hole in which the speaker unit is mounted; and
    an upper body which covers the opened upper surface of the lower body.

4. The robot according to claim 3, wherein the upper body includes a passive radiator mounting hole on which a passive radiator is mounted.

5. The robot according to claim 3, wherein the upper body includes a speaker accommodation housing that accommodates the speaker, the speaker accommodation housing protruding upward from an upper surface of the upper body.

6. The robot according to claim 5, wherein the first body includes a dome cover which protrudes upward from an upper surface of the first body and in which the speaker accommodation housing is accommodated.

7. The robot according to claim 1, wherein the first body includes:
    a spin housing in which the speaker is accommodated; and
    a spin cover which covers an upper side of the spin housing.

8. The robot according to claim 7, wherein the spin housing includes a cover fastening boss which is fastened to a housing fastening boss formed on the spin cover, and
    wherein the annular shaped housing includes a recess which is recessed inwardly in a radial direction from an outer circumference of the annular shaped housing, wherein the cover fastening boss and the housing fastening boss are provided in the recess.

9. The robot according to claim 8, wherein the spin housing includes a fixing rib which protrudes inward from an inner surface of the spin housing, and wherein the annular shaped housing includes an insertion groove into which the fixing rib is inserted.

10. The robot according to claim 1, wherein a diameter of a top of the annular shaped housing is larger than a diameter of a bottom of the annular shaped housing.

11. A robot comprising:
a base;
a first body connected to the base and configured to be rotatable with respect to the base;
a speaker accommodated in the first body and configured to be rotated together with the first body; and
an outer case which surrounds at least a portion of an outer circumference of the first body and rotates together with the first body,
wherein the speaker includes:
a speaker unit which emits sound; and
an annular shaped housing that accommodates at least a part of the speaker unit, the annular shaped housing being accommodated within the first body,
wherein the first body includes a plurality of sound holes spaced apart from each other by a predetermined distance along a circumferential direction of the first body,
wherein a distance between an upper end of the first body and a lower end of the outer case in a vertical direction is shorter than a distance between the upper end of the first body and the plurality of sound holes in the vertical direction.

12. The robot according to claim 11, wherein the annular shaped housing includes an opening through which sound generated by the speaker unit exits from the annular shaped housing, and the opening is arranged to face at least one of the sound holes.

13. The robot according to claim 11, wherein a diameter of a top of the first body is larger than a diameter of a bottom of the first body, and wherein the plurality of sound holes is formed at a lower end of the first body.

14. The robot according to claim 11, wherein the outer case overlaps the speaker in a horizontal direction.

15. The robot according to claim 11, further comprising:
an interface module which is mounted on a front of the outer case, wherein the speaker unit and the interface module are eccentric in a same radial direction from a rotation axis of the first body.

16. The robot according to claim 11, further comprising:
a tilting base which is connected to a shaft connected to the first body to be tiltable and coupled to an inside of the outer case; and
a tilting motor configured to provide power to rotate the tilting base about the shaft, the tilting motor being accommodated in the first body.

17. The robot according to claim 16, wherein the annular shaped housing includes a cut out that is configured to accommodate the tilting motor.

18. A robot comprising:
a base;
a first body which is connected to the base and configured to be rotatable with respect to the base;
an outer case which rotates together with the first body and includes a display, the outer case surrounds at least a portion of an outer circumference of the first body and rotates together with the first body; and
a speaker which is accommodated in the first body, eccentrically disposed with respect to a rotation axis of the first body, and revolves about the rotation axis of the first body,
wherein the display and the speaker are arranged in a same radial direction from the rotation axis of the first body,
wherein a height from a lower surface of the base to a bottom of the speaker is less than half of a height from the lower surface of the base to an upper end of the outer case.

* * * * *